US010353574B2

(12) United States Patent
Song et al.

(10) Patent No.: US 10,353,574 B2
(45) Date of Patent: Jul. 16, 2019

(54) PHOTOGRAPHIC APPARATUS, CONTROL METHOD THEREOF, AND NON-TRANSITORY COMPUTER-READABLE RECORDING MEDIUM

(71) Applicant: Samsung Electronics Co., Ltd., Gyeonggi-do (KR)

(72) Inventors: Won-seok Song, Seoul (KR); Myung-kyu Choi, Gyeonggi-do (KR); Tae-hoon Kang, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 207 days.

(21) Appl. No.: 15/085,115

(22) Filed: Mar. 30, 2016

(65) Prior Publication Data

US 2016/0291861 A1    Oct. 6, 2016

(30) Foreign Application Priority Data

Apr. 1, 2015  (KR) .................. 10-2015-0046197

(51) Int. Cl.
| G06F 3/0488 | (2013.01) |
| G06F 3/0485 | (2013.01) |
| G06F 3/0484 | (2013.01) |
| G06F 3/0482 | (2013.01) |
| H04N 5/232  | (2006.01) |

(Continued)

(52) U.S. Cl.
CPC ........ *G06F 3/04883* (2013.01); *G06F 3/0482* (2013.01); *G06F 3/0485* (2013.01); *G06F 3/04817* (2013.01); *G06F 3/04842* (2013.01); *G06F 3/04845* (2013.01); *H04N 1/00* (2013.01); *H04N 5/23216* (2013.01); *H04N 5/23293* (2013.01); *G06F 2203/04803* (2013.01); *G06F 2203/04806* (2013.01)

(58) Field of Classification Search
CPC .. H04N 5/23293; H04N 5/23216; H04N 1/00; G06F 3/04883; G06F 3/04845; G06F 3/0485; G06F 3/0482; G06F 3/04817; G06F 3/04842; G06F 2203/04806; G06F 2203/04803
See application file for complete search history.

(56) References Cited

U.S. PATENT DOCUMENTS

| 9,088,719 B2 | 7/2015 | Yi et al. |
| 9,280,223 B2 | 3/2016 | Toida et al. |

(Continued)

FOREIGN PATENT DOCUMENTS

| CN | 103227898 A | 7/2013 |
| CN | 103685724 A | 3/2014 |

(Continued)

OTHER PUBLICATIONS

European Search Report dated Jul. 27, 2016.

(Continued)

*Primary Examiner* — Amy M Levy
(74) *Attorney, Agent, or Firm* — Cha & Reiter, LLC.

(57) ABSTRACT

A method comprising: displaying a live view image on a screen; detecting a first gesture that is performed on the screen when the live view image is displayed; and displaying a thumbnail menu on the screen together with the live view image based on a duration of the first gesture.

17 Claims, 15 Drawing Sheets

(51) Int. Cl.
*G06F 3/0481* (2013.01)
*H04N 1/00* (2006.01)

(56) References Cited

U.S. PATENT DOCUMENTS

| | | | |
|---|---|---|---|
| 2004/0246240 A1* | 12/2004 | Kolmykov-Zotov | ........................ G06F 3/03545 345/179 |
| 2007/0290994 A1* | 12/2007 | Kawasaki | ............... G06F 3/038 345/157 |
| 2010/0017710 A1* | 1/2010 | Kim | ...................... G06F 3/0414 715/702 |
| 2010/0146459 A1 | 6/2010 | Repka | |
| 2010/0162182 A1* | 6/2010 | Oh | ...................... G06F 3/04883 715/863 |
| 2010/0194920 A1 | 8/2010 | Gai et al. | |
| 2011/0035665 A1* | 2/2011 | Kim | .................... G06F 3/04883 715/702 |
| 2011/0124376 A1* | 5/2011 | Kim | ...................... G06F 1/1626 455/566 |
| 2012/0198386 A1* | 8/2012 | Hautala | ................. G06F 3/0481 715/838 |
| 2013/0194215 A1 | 8/2013 | Toida et al. | |
| 2014/0071323 A1* | 3/2014 | Yi | ....................... G06F 3/04883 348/333.01 |
| 2014/0146212 A1 | 5/2014 | Jung et al. | |
| 2014/0210741 A1 | 7/2014 | Komatsu et al. | |
| 2014/0323121 A1 | 10/2014 | Kim et al. | |
| 2015/0334291 A1* | 11/2015 | Cho | ....................... G06F 3/0488 348/222.1 |

FOREIGN PATENT DOCUMENTS

| | | |
|---|---|---|
| CN | 103870157 A | 6/2014 |
| EP | 2 706 447 A | 3/2014 |
| JP | 2010-226319 A | 10/2010 |
| KR | 10-2014-0067511 A | 6/2014 |

OTHER PUBLICATIONS

Chinese Search Report dated Jul. 5, 2018.
Chinese Search Report dated Jan. 24, 2019.
European Search Report; dated Mar. 22, 2019.
European Summons to Oral Proceedings dated Mar. 26, 2019.
Chinese Search Report dated May 27, 2019.

* cited by examiner

FIG. 1A
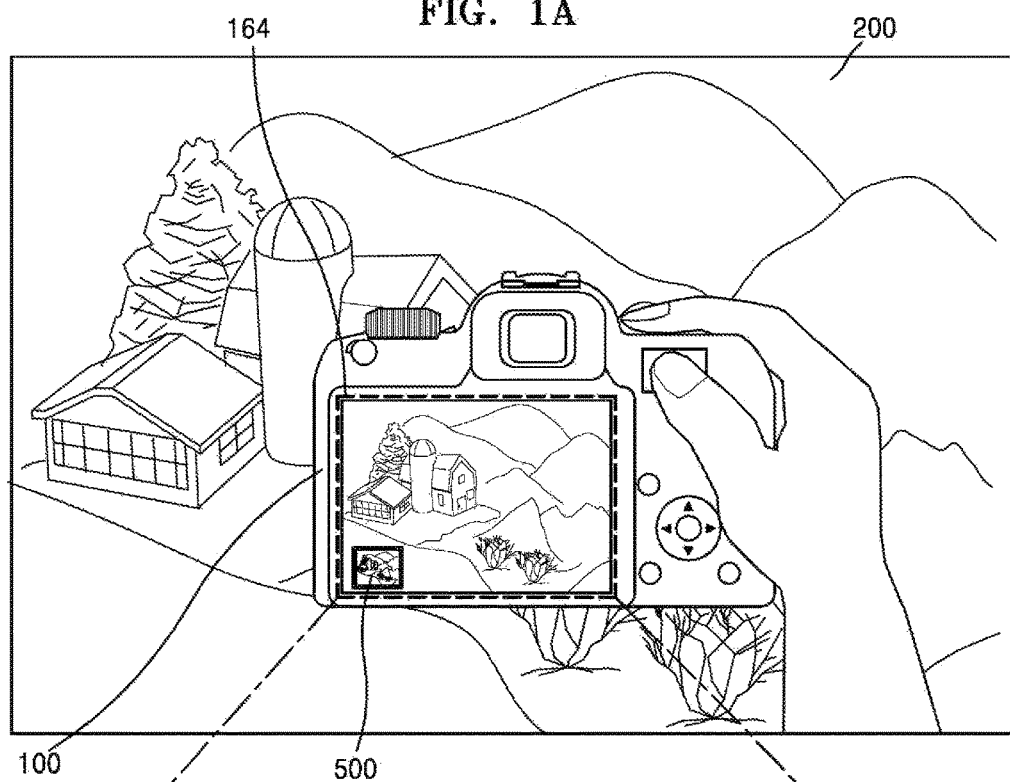
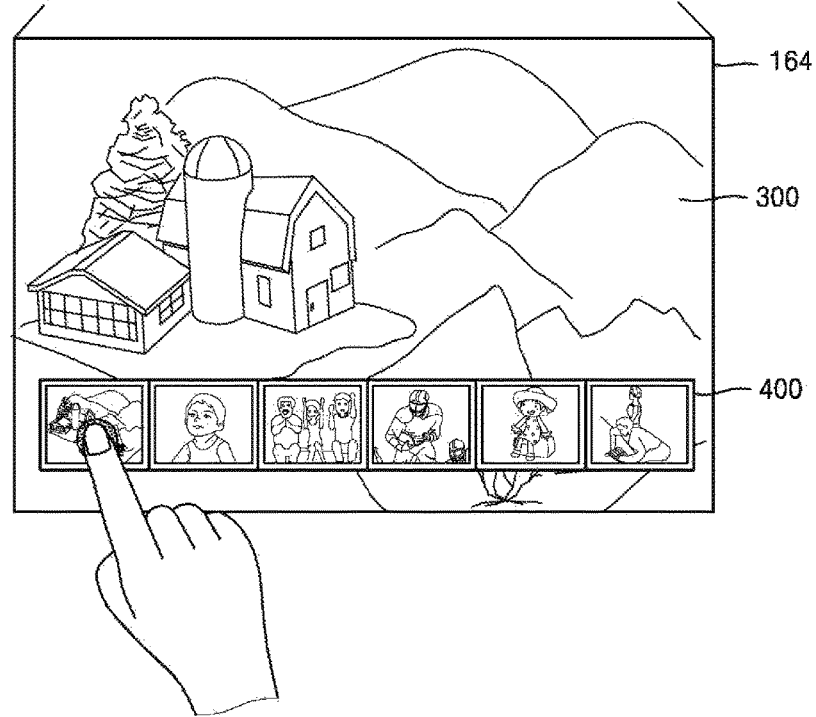

FIG. 1B
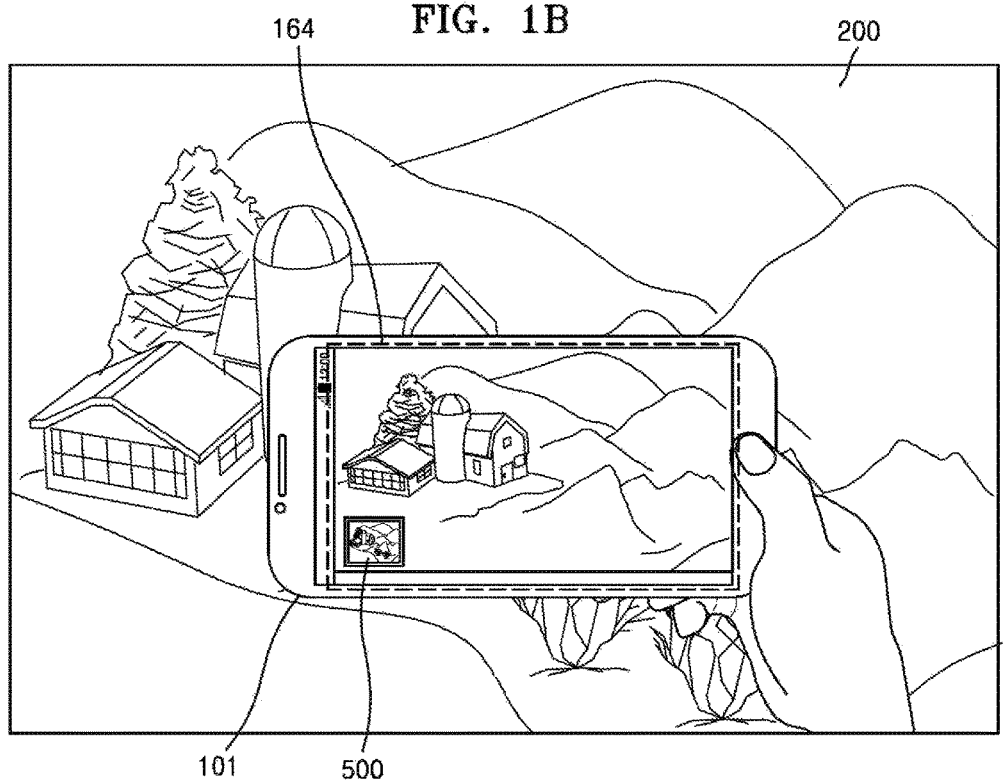
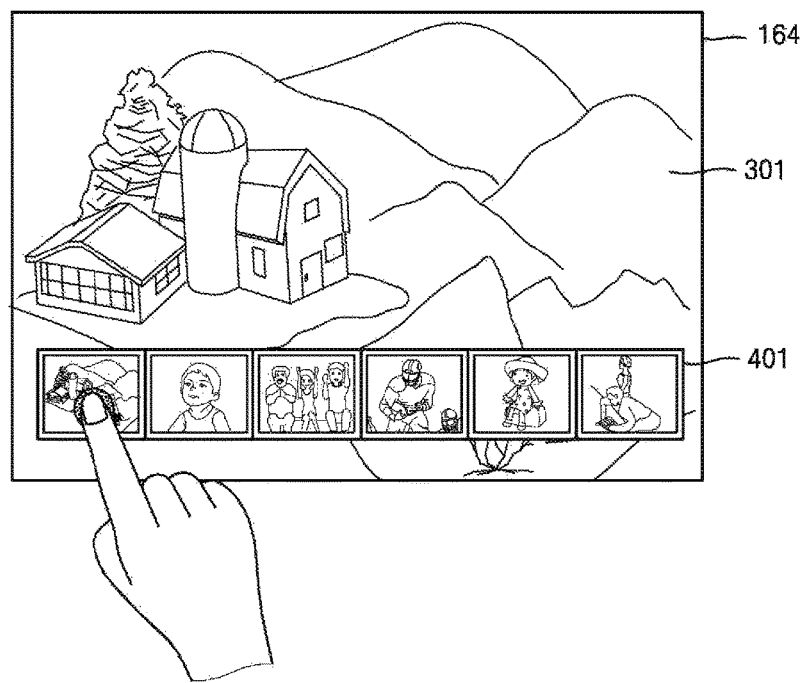

FIG. 7A
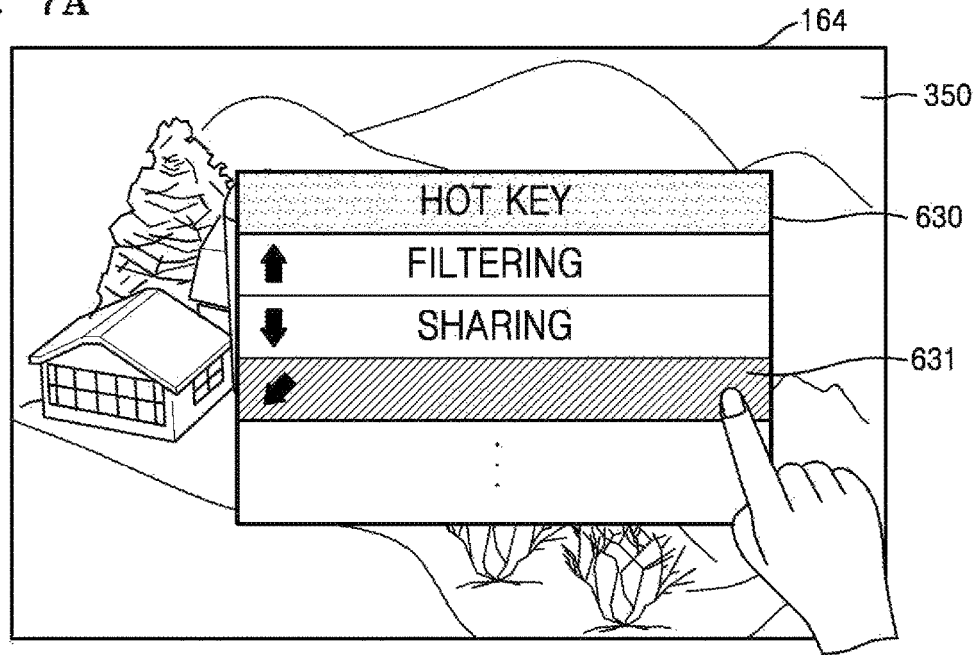
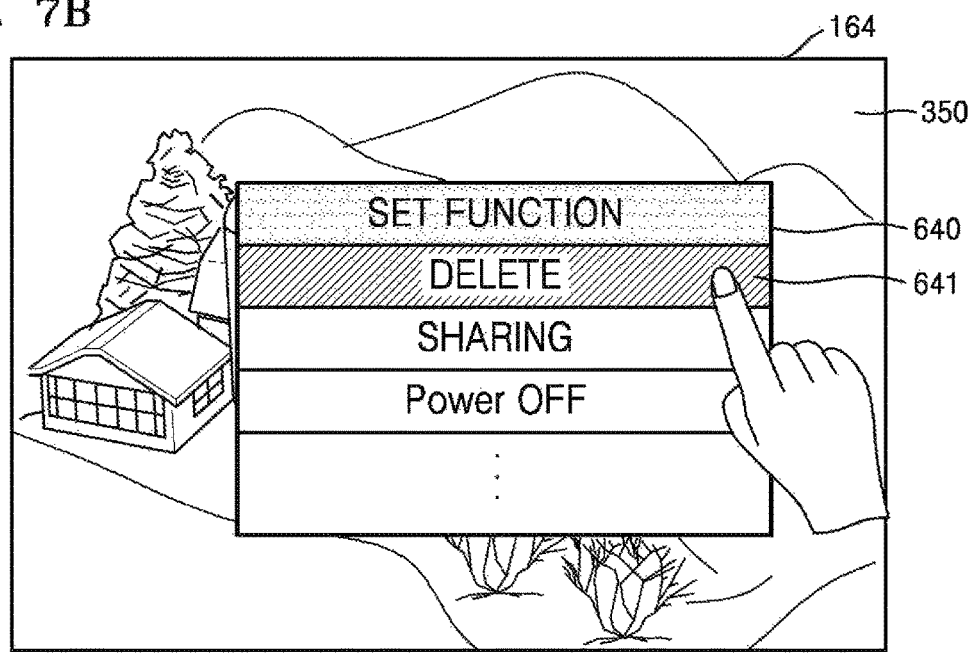
FIG. 7B

AFTER ONE SECOND

AFTER ONE SECOND

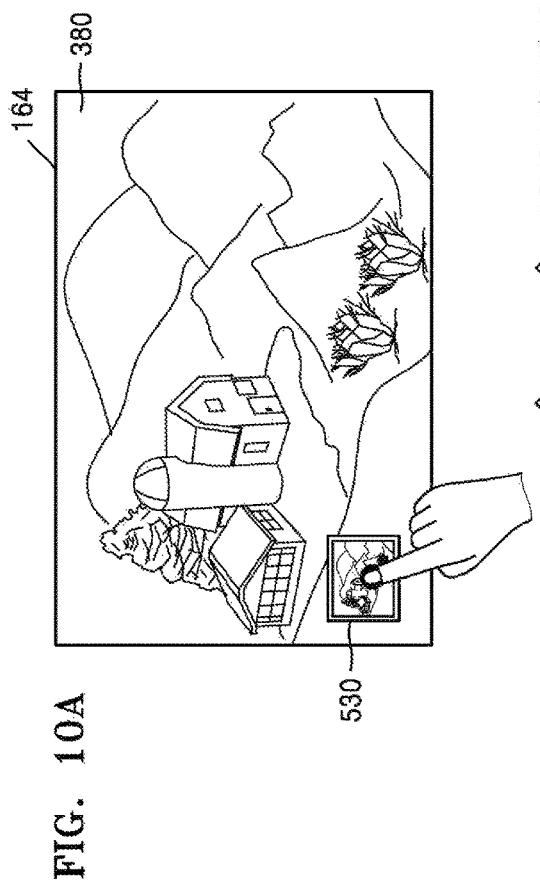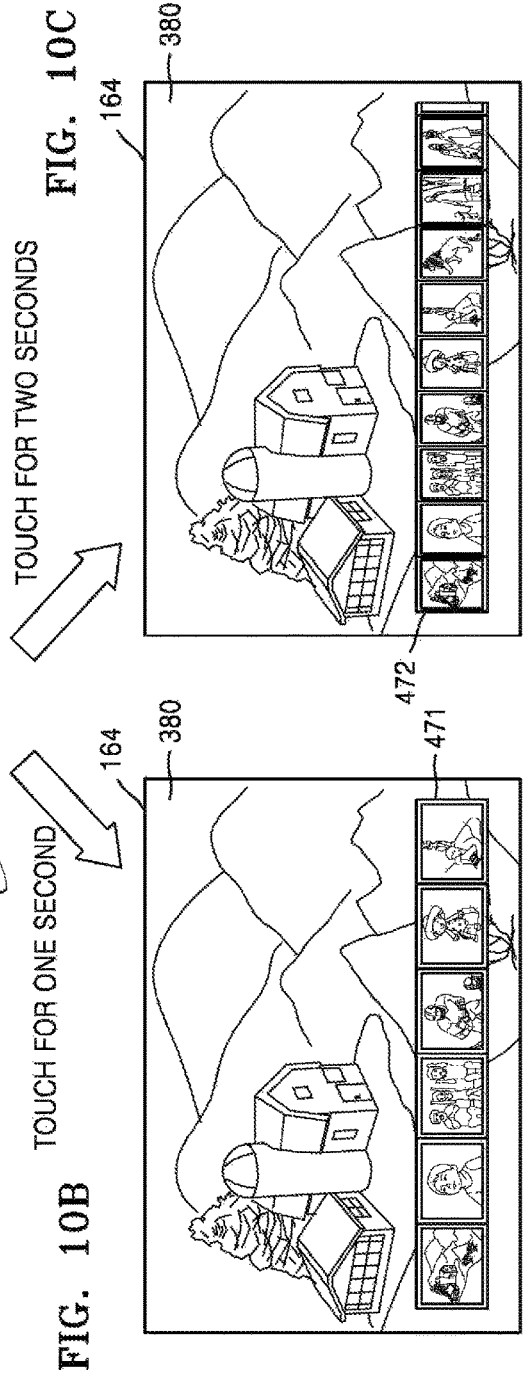

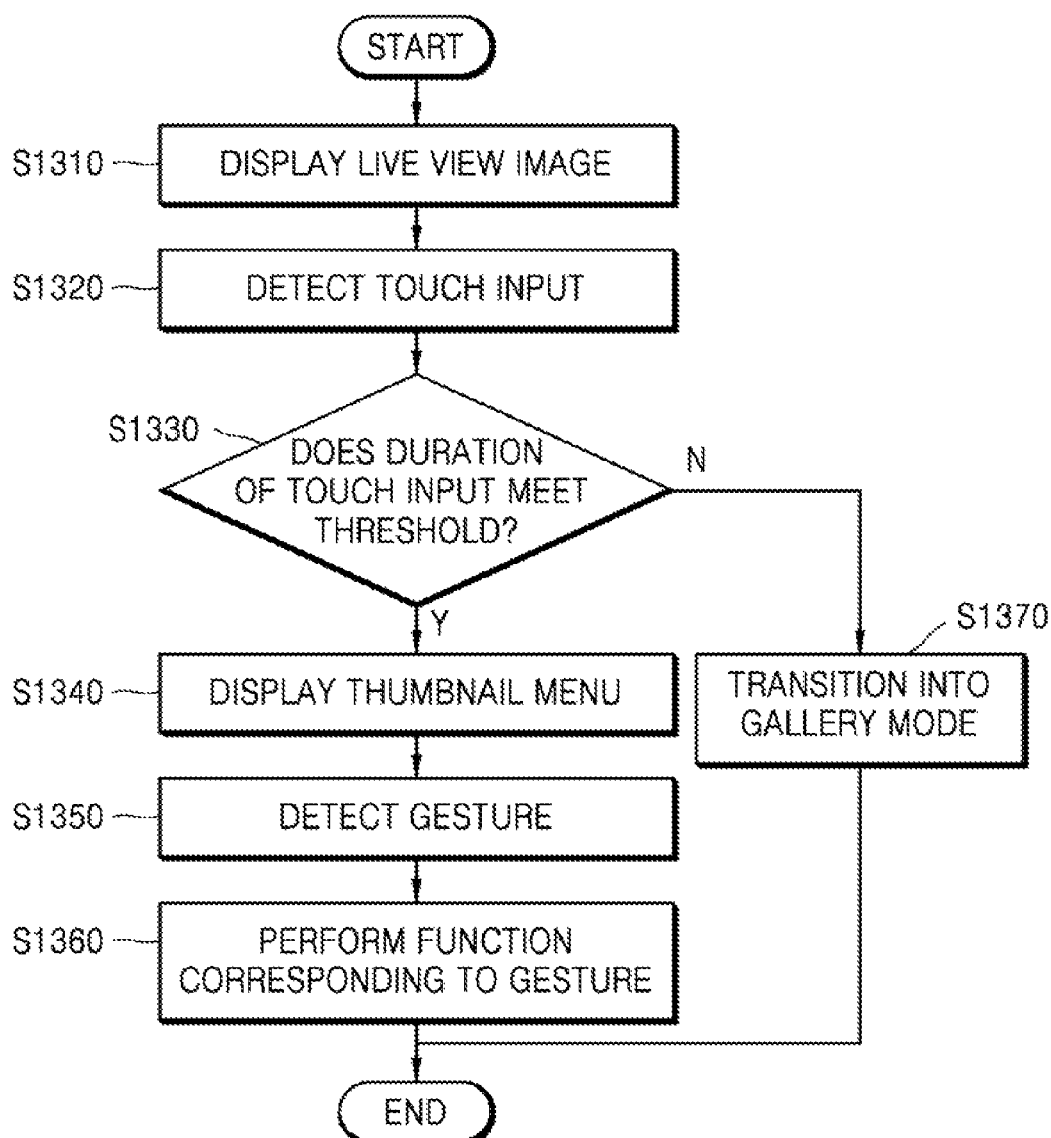

PHOTOGRAPHIC APPARATUS, CONTROL METHOD THEREOF, AND NON-TRANSITORY COMPUTER-READABLE RECORDING MEDIUM

CLAIM OF PRIORITY

This application claims the benefit of Korean Patent Application No. 10-2015-0046197, filed on Apr. 1, 2015, in the Korean Intellectual Property Office, the disclosure of which is incorporated herein in its entirety by reference.

BACKGROUND

1. Field

The present disclosure relates to electronic devices, in general, and more particularly to a photographic apparatus, control method thereof, and non-transitory computer-readable medium.

2. Description of the Related Art

Along with the development of techniques related to photographing apparatuses, photographing apparatuses capable of capturing a high-definition image have been developed. However, when a user desires to view a pre-captured image, it is recommended that a photographing apparatus is changed to a gallery mode. In this case, a time of driving software for activating the gallery mode is taken, and if a change to the gallery mode is repeated, the user may feel inconveniency.

In addition, along with the development of touch screen techniques, a demand of a technique of performing various functions based on gestures of a used which are inputted on a screen of a photographing apparatus has increased.

SUMMARY

According to aspects of the disclosure, a method is provided comprising: displaying a live view image on a screen; detecting a first gesture that is performed on the screen when the live view image is displayed; and displaying a thumbnail menu on the screen together with the live view image based on a duration of the first gesture.

According to aspects of the disclosure, an apparatus is provided comprising: a display; a memory; and at least one processor operatively coupled to the memory, configured to: displaying a live view image on the display; detecting a first gesture when the live view image is displayed; and displaying a thumbnail menu on the display together with the live view image based on a duration of the first gesture.

BRIEF DESCRIPTION OF THE DRAWINGS

These and/or other aspects will become apparent and more readily appreciated from the following description of the embodiments, taken in conjunction with the accompanying drawings in which:

FIG. 1A is a diagram of an example of user interface, according to embodiments;

FIG. 1B is a diagram of an example of a user interface, according to embodiments;

FIG. 7A is a diagram of an example of user interface for associating a function with a particular gesture, according to an embodiment;

FIG. 7B is a diagram of an example of user interface for associating a function with a particular gesture, according to an embodiment;

FIG. 10A is a diagram of an example of a user interface for changing the number of images included in a thumbnail menu, according to an embodiment;

FIG. 10B is a diagram of an example of a user interface for changing the number of images included in a thumbnail menu, according to an embodiment;

FIG. 10C is a diagram of an example of a user interface for changing the number of images included in a thumbnail menu, according to an embodiment;

FIG. 13 is a flowchart of an example of a process, according to another embodiment.

DETAILED DESCRIPTION

Figure 2A:
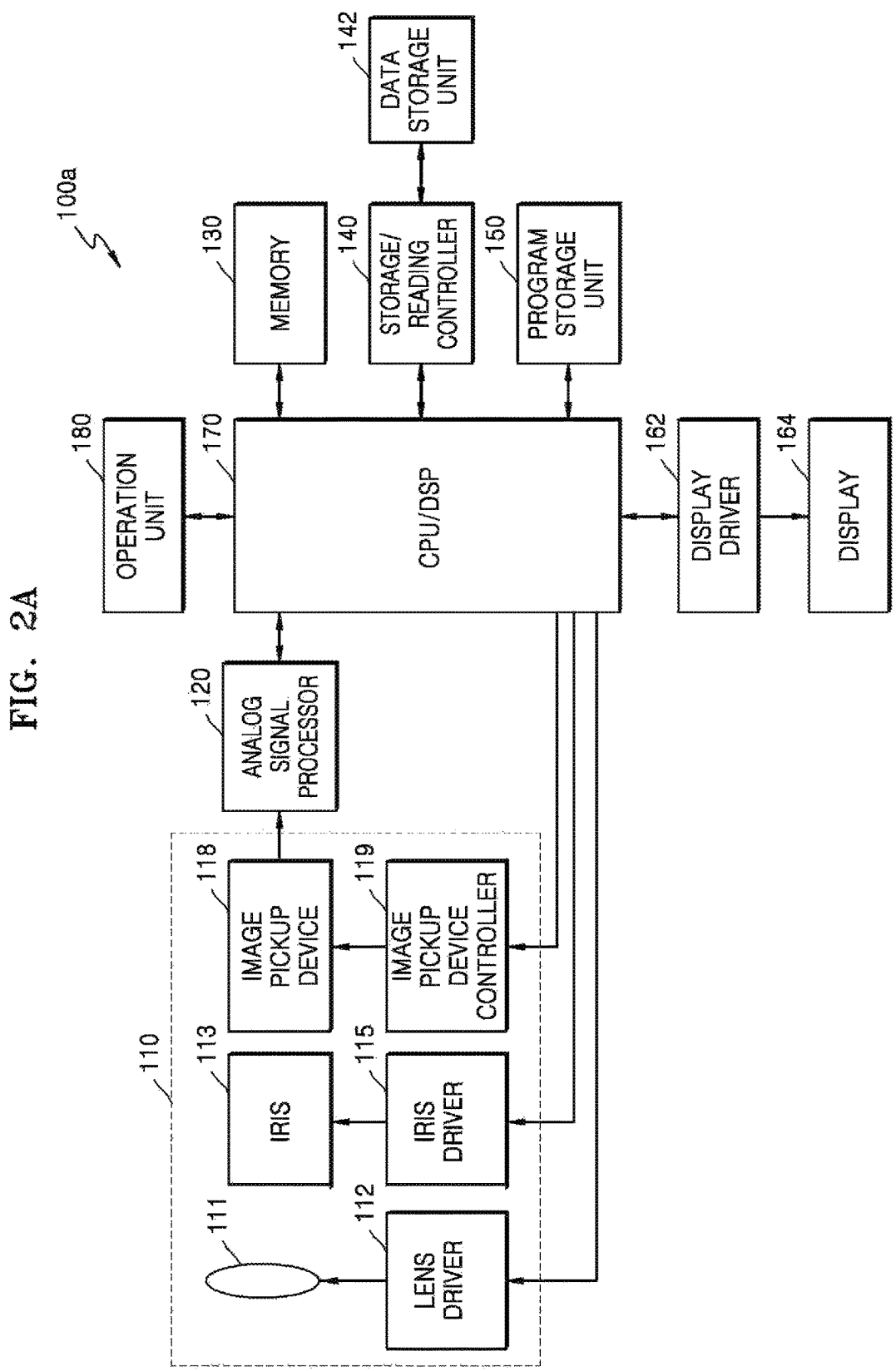
FIG. 2A is a block diagram of an example of a photographic apparatus, according to an embodiment.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects. As used herein, the term "and/or" includes any and all combinations of one or more of the associated listed items. Expressions such as "at least one of," when preceding a list of elements, modify the entire list of elements and do not modify the individual elements of the list.

Throughout the specification, when a certain part "includes" a certain component, this indicates that the part may further include another component instead of excluding another component unless there is different disclosure. In addition, the term, such as "... unit" or "module," disclosed in the specification indicates a unit for processing at least one function or operation, and this may be implemented by hardware, software, or a combination thereof. In addition, the term '... unit' used in the specification indicates a component including software or hardware, such as a Field Programmable Gate Array (FPGA) or an Application-Specific Integrated Circuit (ASIC), and the '... unit' performs certain roles. However, the '... unit' is not limited to software or hardware. The '... unit' may be configured to be included in an addressable storage medium or to reproduce one or more processors. Therefore, for example, the '... unit' includes components, such as software components, object-oriented software components, class components, and task components, processes, functions, attributes, procedures, subroutines, segments of program code, drivers, firmware, microcode, circuits, data, a database, data structures, tables, arrays, and variables. A function provided inside components and '... units' may combine them into a smaller number of components and '... units' or further divide them into additional components and '... units'.

Throughout the specification, the term "gesture" indicates a motion of a user with a hand or the like. For example, the gesture described in the specification may include a tap, a touch and hold, a double tap, a drag, a panning, a flick, a drag and drop, or the like.

The term "tap" indicates an operation in which a user quickly touches a screen by using a finger or a touch tool (e.g., a stylus). That is, a time difference between a touch-in time point that is a time point where the finger or the touch tool contacts a screen and a touch-out time point that is a time point where the finger or the touch tool is lifted from the screen is very short.

The term "touch and hold" indicates an operation in which a user touches a screen by using a finger or a touch tool and then maintains the touch input for a critical time. That is, a time difference between a touch-in time point and a touch-out time point is the critical time or more. In order for the user to recognize whether a touch input is a tap or a touch and hold, when the touch input is maintained for the critical time or more, an auditory or tactile feedback signal may be provided.

The term "double tap" indicates an operation in which a user quickly touches a screen twice by using a finger or a touch tool.

The term "drag" indicates an operation in which a user touches a screen by using a finger or a touch tool and then moves the finger or the touch tool to another location on the screen in a state of maintaining the touch. Due to a drag action, an object (e.g., one image included in a thumbnail menu) may move, or a panning operation to be described below may be performed.

The term "panning" indicates a case where a user performs a drag action without selecting an object. Since a certain object is not selected by a panning, no object moves in an interactive screen image, instead the interactive screen image moves to a next page on a screen, or an object group moves in the interactive screen image.

The term "flick" indicates a drag operation at a very quick speed, which is performed by a user using a finger or a touch tool. A drag (or panning) and a flick may be discriminated from each other based on whether a moving speed of the finger or the touch tool is a critical speed or more.

The term "drag and drop" indicates an operation in which a user drags an object to a certain location on a screen and drops the object at the certain location by using a finger or a touch tool.

FIGS. 1A and 1B illustrate examples of a user interface for controlling a photographic apparatus 100 or 101, according to embodiments.

FIG. 1A illustrates the photographic apparatus 100 and an object to be photographed 200, according to an embodiment. For example, the photographic apparatus 100 may be a camera. Also, the object to be photographed 200 may be an object which may be photographed using the photographic apparatus 100 and may correspond to human beings, animals and plants, matters, scenery, and the like without limitation.

A user may photograph the object to be photographed 200 by using the photographic apparatus 100, and a live view image 300 showing the object to be photographed 200 may be displayed on a display 164. The live view image 300 indicates an image in which the object to be photographed 200 in sight of the photographic apparatus 100 (i.e., sight of a lens included in the photographic apparatus 100) is shown. Since the photographic apparatus 100 displays the live view image 300 on the display 164 in real-time, the user may easily photograph a desired object.

In general, the live view image 300 is outputted to the display 164 when the photographic apparatus 100 is in a photographic mode. The photographic mode indicates a state in which the photographic apparatus 100 is enabled to photograph the object to be photographed 200. In other words, the user may set the photographic apparatus 100 to be in the photographic mode and perform photographic while referring to the live view image 300 displayed on the display 164.

In order for the user to view a pre-captured image, it is recommended that the photographic apparatus 100 is changed to a gallery mode. In other words, the user may view a pre-captured image by changing the photographic apparatus 100 to be in the gallery mode and using a thumbnail menu displayed on the display 164. The thumbnail menu may include at least one pre-captured small-sized images. When the user selects one image included in the thumbnail menu, the display 164 may display the selected image as an original-sized image.

In general, when the photographic mode is changed to the gallery mode, the thumbnail menu is displayed on the display 164 instead of the live view image 300. In other words, both the live view image 300 and the thumbnail menu are not displayed on a screen. Therefore, the user cannot simultaneously view the object to be photographed 200, (e.g., an object which the user wishes to photograph), and a pre-captured image. Also, a mode change between the photographic mode and the gallery mode requires a time taken for the user to select a mode to be changed and a time taken to operate software needed for the mode change.

According to one or more embodiments, both the live view image 300 and a thumbnail menu 400 are displayed on the display 164 of the photographic apparatus 100. In detail, the photographic apparatus 100 may receive a gesture inputted in one region of the display 164 while the live view image 300 is displayed. In this case, the photographic apparatus 100 may display the thumbnail menu 400 based on a duration of the gesture. Since the live view image 300 is already displayed on the display 164, the thumbnail menu 400 is displayed by overlapping the live view image 300.

For example, an icon 500 may be displayed in one region of the display 164, and the user may input a gesture on the icon 500. In this case, the photographic apparatus 100 may measure a duration of the gesture and display the thumbnail menu 400 on the live view image 300 if the measured duration meets a threshold (e.g., if the duration is greater than or equal to one second). For example, the gesture may be a touch and hold inputted by the user.

As described above, the photographic apparatus 100 may display the thumbnail menu 400 showing pre-captured images even in the photographic mode. Also, since both the live view image 300 and the thumbnail menu 400 may be displayed, the user may easily select the object to be photographed 200, which is desired to be photographed at present, and refer to the pre-captured images.

FIG. 1B the photographic apparatus 101 and the object to be photographed 200, according to another embodiment.

Although it has been described with reference to FIG. 1 that the photographic apparatus 100 is a camera, the photographic apparatus 100 of FIG. 1A is not limited thereto. In other words, the photographic apparatus 101 of FIG. 1B may indicate an electronic apparatus having a camera function. According to one or more embodiments, the electronic apparatus may include at least one of, for example, a smartphone, a tablet personal computer (PC), a mobile phone, a video phone, and a wearable device. According to one or more embodiments, the wearable device may include at least one of an accessory-type device (e.g., a watch, a ring, a bracelet, an anklet, a necklace, glasses, a contact lens, or a head-mounted device (HMD)), a textile or clothes-embedded type device (e.g., electronic clothes), a body attachment-type device, and an implantable-type device (e.g., an implantable circuit).

A user may photograph the object to be photographed 200 by using the photographic apparatus 101, and a live view image 101 showing the object to be photographed 200 may be displayed on the display 164 of the photographic apparatus 101. Also, both the live view image 101 and a thumbnail menu 401 may be displayed on the display 164 of the photographic apparatus 101.

As described above with reference to FIG. 1A, based on a gesture of the user, the thumbnail menu 401 may be displayed on the display 164, and various functions of the photographic apparatus 101 may be performed.

Hereinafter, embodiments of the photographic apparatus 100 or 101 are described in detail with reference to FIGS. 2A and 2B.

FIG. 2A is a block diagram of an example a photographic apparatus 100a, according to an embodiment.

The photographic apparatus 100a may include a photographic unit 110, an analog signal processor 120, a memory 130, a storing/reading controller 140, a data storage unit 142, a program storage unit 150, a display driver 162, the display 164, a central processing unit (CPU)/digital signal processor (DSP) 170, and an operation unit 180.

An overall operation of the photographic apparatus 100a is controlled by the CPU/DSP 170. The CPU/DSP 170 may include any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), etc. For example, the CPU/DSP 170 may provide a control signal for operating each component to a lens driver 112, an iris driver 115, an image pickup device controller 119, and the like.

The photographic unit 110 generates an image of an electrical signal from incident light and may include a lens 111, the lens driver 112, an iris 113, the iris driver 115, an image pickup device 118, and the image pickup device controller 119.

The lens 111 may include a plurality of groups or pieces of lenses. A position of the lens 111 is adjusted by the lens driver 112. In operation, the lens driver 112 may adjust the position of the lens 111 according to a control signal provided from the CPU/DSP 170.

A degree of opening or closing the iris 113 is adjusted by the iris driver 115, thereby adjusting the intensity of light incident on the image pickup device 118.

An optical signal which has transmitted through the lens 111 and the iris 113 arrives at the image pickup device 118, thereby forming an image of a subject on a light-receiving surface of the image pickup device 118. The image pickup device 118 may include a charge coupled device (CCD) image sensor or a complementary metal oxide semiconductor image sensor (CIS) for converting the optical signal into an electrical signal. Sensitivity and the like of the image pickup device 118 may be adjusted by the image pickup device controller 119. The image pickup device controller 119 may control the image pickup device 118 according to a control signal automatically generated in response to an image signal inputted in real-time or a control signal manually inputted by an operation of a user.

A light-exposure time of the image pickup device 118 is adjusted using a shutter (not shown). The shutter may be a mechanical shutter configured to adjust the intensity of incident light by moving the iris 113 or an electronic shutter configured to control light exposure by supplying an electrical signal.

The analog signal processor 120 performs noise reduction processing, gain adjustment, waveform normalization, analog-digital conversion processing, and the like on an analog signal supplied from the image pickup device 118.

The signal processed by the analog signal processor 120 may be inputted to the CPU/DSP 170 via the memory 130 or directly inputted to the CPU/DSP 170. The memory 130 may include any suitable type of volatile or non-volatile memory, such as Random-access Memory (RAM), Read-Only Memory (ROM), Network Accessible Storage (NAS), cloud storage, a Solid State Drive (SSD), etc. In some implementations, the memory 130 may operate as a main memory of the photographic apparatus 100a and temporarily stores information required during an operation of the CPU/DSP 170. The program storage unit 150 stores programs, such as an operating system (OS) and an application system, for operating the photographic apparatus 100a.

The photographic apparatus 100a includes the display 164 so as to display an operating state of the photographic apparatus 100a or information about images captured by the photographic apparatus 100a. The display 164 may provide visual information and/or auditory information to the user. In order to provide visual information, the display 164 may include, for example, a liquid crystal display (LCD) panel, an organic light-emitting display panel, or the like. Also, the display 164 may include a touch screen capable of recognizing a touch input.

The display driver 162 provides a driving signal to the display 164.

The CPU/DSP 170 processes an inputted image signal and controls each component according to the processed image signal or an external input signal. The CPU/DSP 170 may perform image signal processing for image quality enhancement, such as noise reduction, gamma correction, color filter array interpolation, color matrix, color correction, and color enhancement, on inputted image data. Also, the CPU/DSP 170 may generate an image file by compressing image data generated through the image signal processing for image quality enhancement or restore image data from the image file. An image compression format may be a reversible format or an irreversible format. For example, a still image may be transformed into a joint photographic experts group (JPEG) format or a JPEG 2000 format. Also, when a video is recorded, a video file may be generated by compressing a plurality of frames according to a moving picture experts group (MPEG) standard. The image file may be generated according to an exchangeable image file format (Exif) standard.

The image file outputted from the CPU/DSP 170 is inputted to the storing/reading controller 140 via the memory 130 or directly, and the storing/reading controller 140 stores the image file in the data storage unit 142 according to a signal from the user or automatically. Also, the storing/reading controller 140 may read data about an image from an image file stored in the data storage unit 142 and transmit the read data to the display driver 162 via the memory 130 or another path, thereby displaying the image on the display 164. The data storage unit 142 may be detachable or permanently mounted in the photographic apparatus 100*a*.

Also, the CPU/DSP 170 may perform image sharpening, color processing, blur processing, edge enhancement processing, image analysis processing, image recognition processing, image effect processing, and the like. The image recognition processing may include face recognition processing, scene recognition processing, and the like. Also, the CPU/DSP 170 may perform display image signal processing for displaying an image on the display 164. For example, the CPU/DSP 170 may perform brightness level adjustment, color correction, contrast adjustment, outline enhancement adjustment, screen division processing, generation of a character image, image synthesis processing, and the like. The CPU/DSP 170 may be connected to an external monitor and perform certain image signal processing such that an image is displayed on the external monitor, and may transmit processed image data to the external monitor to display a corresponding image on the external monitor.

Also, the CPU/DSP 170 may execute a program stored in the program storage unit 150 or include a separate module to generate a control signal for controlling auto focusing, zooming, a focal point change, auto-exposure correction, and the like and to provide the generated control signal to the iris driver 115, the lens driver 112, and the image pickup device controller 119 and may control an overall operation of components, such as the shutter and a strobe, included in the photographic apparatus 100*a*.

The operation unit 180 is a component by which the user inputs a control signal. The operation unit 180 may include various function buttons such as a shutter-release button for inputting a shutter-release signal for exposing the image pickup device 118 to light for a defined time to take a picture, a power button for inputting a control signal for controlling power on/off, a zoom button for widening or narrowing an angle of view, a mode selection button, and a photographic configuration value adjustment button. The operation unit 180 may be implemented in any type by which the user inputs a control signal, such as a button, a keyboard, a touchpad, a touch screen, or a remote control.

FIG. 2A illustrates only components required to perform photographic by using the photographic apparatus 100*a*, and the photographic apparatus 100*a* according to the present embodiment is not limited thereto.

Hereinafter, another embodiment of the photographic apparatus 100 or 101 is described in detail with reference to FIG. 2B.

Figure 2B:
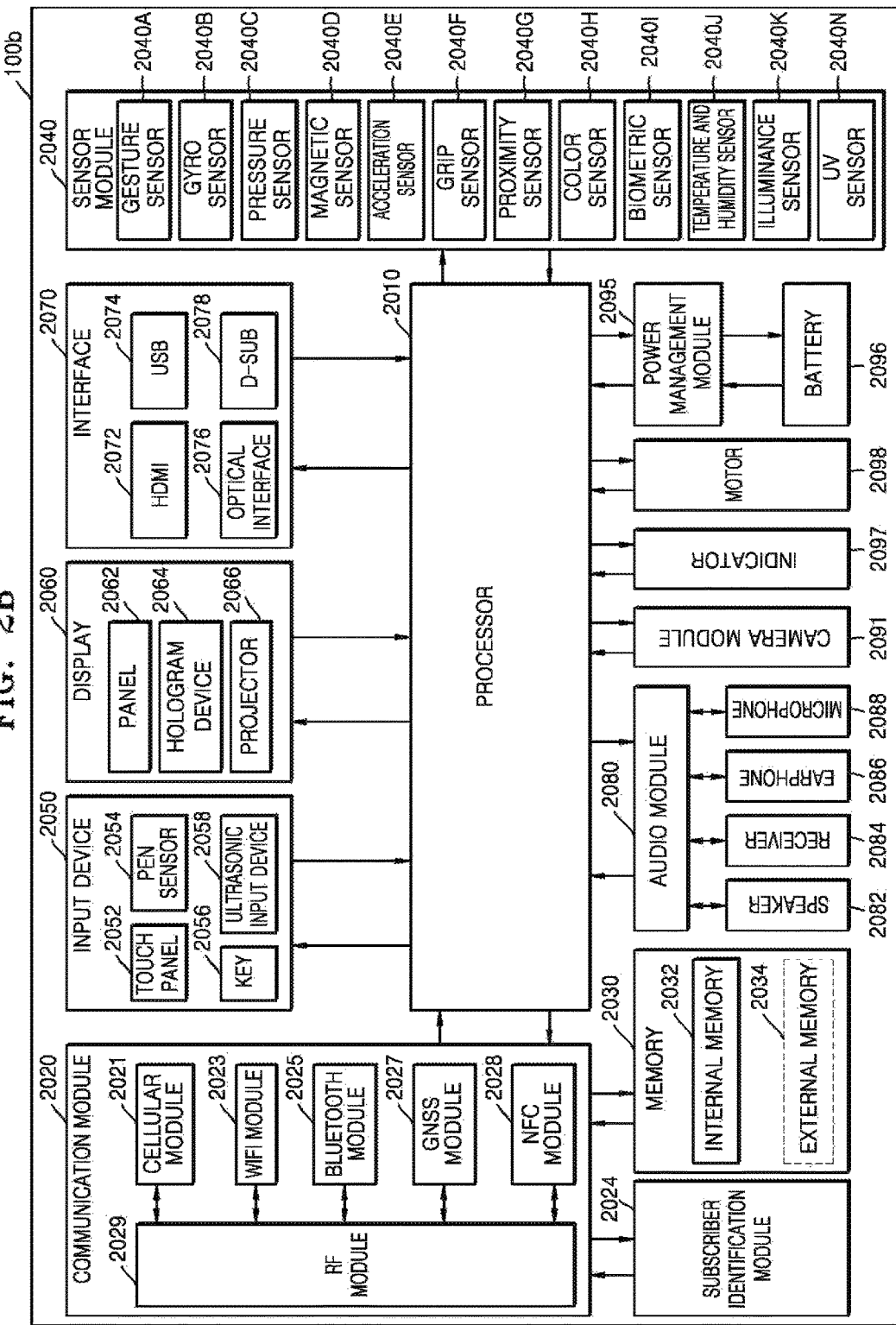
FIG. 2B is a block diagram of an example of a photographic apparatus, according to another embodiment.

FIG. 2B is a block diagram of an example of a photographic apparatus (electronic apparatus) 2000, according to another embodiment.

For example, the electronic apparatus 2000 may include all or a portion of the photographic apparatus 101 of FIG. 1B. The electronic apparatus 2000 may include at least one processor (e.g., an application processor (AP)) 2010, a communication module 2020, a subscriber identification module 2024, a memory 2030, a sensor module 2040, an input device 2050, a display 2060, an interface 2070, an audio module 2080, a camera module 2091, a power management module 2095, a battery 2096, an indicator 2097, and a motor 2098.

The processor 2010 may control, for example, a plurality of hardware or software components connected thereto by operating an OS or an application program and perform various kinds of data processing and computation. The processor 2010 may include, for example, a system on chip (SoC). According to an embodiment, the processor may further include a graphic processing unit (GPU) and/or an image signal processor. The processor 2010 may include at least some (e.g., a cellular module 2021) of the components shown in FIG. 2B. The processor 2010 may load a command or data received from at least one of the other components (e.g., a nonvolatile memory) to a volatile memory, process the received command or data, and store various kinds of data in the nonvolatile memory.

The communication module 2020 may include, for example, the cellular module 2021, a Wi-Fi module 2023, a Bluetooth module 2025, a global navigation satellite system (GNSS) module 2027 (e.g., a global positioning system (GPS) module, a globalnaya navigatsionnaya sputnikovaya sistema (GLONASS) module, a BeiDou module, or a Galileo module), a near-field communication (NFC) module 2028, and a radio frequency (RF) module 2029.

The cellular module 2021 may provide, for example, a voice call, a video call, a short message service, or an Internet service via a communication network. According to an embodiment, the cellular module 2021 may identify and authenticate the electronic apparatus 2000 in the communication network by using the subscriber identification module 2024 (e.g., a subscriber identity module (SIM) card). According to an embodiment, the cellular module 2021 may perform at least some of the functions which can be provided by the processor 2010. According to an embodiment, the cellular module 2021 may include a communication processor (CP).

Each of the Wi-Fi module 2023, the Bluetooth module 2025, the GNSS module 2027, and the NFC module 2028 may include, for example, a processor for processing data transmitted and received through a corresponding module. According to an embodiment, at least some (e.g., two or more) of the Wi-Fi module 2023, the Bluetooth module 2025, the GNSS module 2027, and the NFC module 2028 may be included in one integrated chip (IC) or an IC package.

The RF module 2029 may transmit and receive, for example, a communication signal (e.g., an RF signal). The RF module 2029 may include, for example, a transceiver, a power amplification module (PAM), a frequency filter, a low noise amplifier (LNA), and an antenna. According to another embodiment, at least one of the Wi-Fi module 2023, the Bluetooth module 2025, the GNSS module 2027, and the NFC module 2028 may transmit and receive an RF signal by using a separate RF module.

The subscriber identification module 2024 may include, for example, a subscriber identification module embedded card and/or an embedded SIM and may have unique identification information (e.g., integrated circuit card identifier (ICCID)) or subscriber information (e.g., international mobile subscriber identity WSW.

The memory 2030 may include, for example, an internal memory 2023 and an external memory 2034. The internal memory 2023 may include at least one of, for example, volatile memories (e.g., dynamic random access memory (DRAM), static RAM (SRAM), and synchronous DRAM (SDRAM)), nonvolatile memories (e.g., one time programmable read-only memory (OTPROM), PROM, erasable and programmable ROM (EPROM), electrically EPROM (EEPROM), mask ROM, and flash ROM, flash memories (e.g., a NAND flash memory and a NOR flash memory)), a hard disk drive (HDD), and a solid state drive (SSD).

The external memory 2034 may further include a flash drive, for example, a compact flash (CF) memory, a secure digital (SD) memory, a micro-SD memory, a mini-SD memory, an extreme digital (xD) memory, a multimedia card (MMC), or a memory stick. The external memory 2034 may be functionally and/or physically connected to the electronic apparatus 2000 through various interfaces.

The sensor module 2040 may measure, for example, a physical amount or detect an operating state of the electronic apparatus 2000 and convert the measured or detected information into an electrical signal. The sensor module 2040 may include at least one of, for example, a gesture sensor 2040A, a gyro sensor 2040B, an atmosphere sensor 2040C, a magnetic sensor 2040D, an acceleration sensor 2040E, a grip sensor 2040F, a proximity sensor 2040G, a color sensor (e.g., a red, green, and blue (RGB) sensor) 2040H, a biosensor 20401, a temperature/humidity sensor 2040J, an illumination sensor 2040K, and an ultraviolet (UV) sensor 2040M. Additionally or alternatively, the sensor module 2040 may include, for example, an E-nose sensor, an electromyography (EMG) sensor, an electroencephalogram (EEG) sensor, an electrocardiogram (ECG) sensor, an infrared (IR) sensor, an iris sensor, and/or a fingerprint sensor. The sensor module 2040 may further include a control circuit for controlling at least one sensor included therein. According to an embodiment, the electronic apparatus 2000 may further include, as a portion of the processor 2010 or separately, a processor configured to control the sensor module 2040, thereby controlling the sensor module 2040 during a sleep mode of the processor 2010.

The input device 2050 may include, for example, a touch panel 2052, a (digital) pen sensor 2054, a key 2056, and an ultrasonic input device 2058. The touch panel 2052 may use at least one way of, for example, capacitive, resistive, IR, and ultrasonic. Also, the touch panel 2052 may further include a control circuit. The touch panel 2052 may further include a tactile layer to provide a tactile feedback to the user.

The (digital) pen sensor 2054 may include, for example a recognition sheet that is a portion of the touch panel 2052 or a separate one. The key 2056 may include, for example, a physical button, an optical key, or a keypad. The ultrasonic input device 2058 may detect an ultrasonic wave generated by an input tool, through a microphone 2088, and confirm data corresponding to the ultrasonic wave.

The display 2060 (e.g., the display 164) may include a panel 2062, a hologram device 2064, or a projector 2066. The panel 2062 may be, for example, flexible, transparent, or wearable. The panel 2062 may be configured to be one module with the touch panel 2052. The hologram device 2064 may display a stereoscopic image by using interference of light. The projector 2066 may display an image by projecting light onto a screen. The screen may be located at, for example, the inside or outside of the electronic apparatus 2000. According to an embodiment, the display 2060 may further include a control circuit for controlling the panel 2062, the hologram device 2064, or the projector 2066.

The interface 2070 may include, for example, a high-definition multimedia interface (HDMI) 2072, a universal serial bus (USB) 2074, an optical interface 2076, or a D-subminiature (D-sub) 2078. Additionally or alternatively, the interface 2070 may include, for example, a mobile high-definition link (MHL) interface, an SD card/MMC interface, or an infrared data association (IrDA) standard interface.

The audio module 2080 may bi-directionally convert, for example, a sound and an electrical signal. The audio module 2080 may perform sound information inputted or outputted through, for example, a speaker 2082, a receiver 2084, earphones 2086, or the microphone 2088.

The camera module 2091 may capture, for example, a still image and a moving picture. According to an embodiment, the camera module 2091 may include at least one image sensor (e.g., a front sensor or a rear sensor), a lens, an image signal processor (ISP), or a flash (e.g., a light-emitting diode (LED) or a xenon lamp).

The power management module 2095 may manage, for example, power of the electronic apparatus 2000. According to an embodiment, the power management module 2095 may include a power management integrated circuit (PMIC), a charger IC, or a battery or fuel gauge. The PMIC may operate in a wired and/or wireless charging scheme. The wireless charging scheme may include, for example, a magnetic resonance scheme, a magnetic induction scheme, or an electromagnetic wave scheme and may further include an additional circuit for wireless charging, for example, a coil loop, a resonance circuit, or a rectifier. The battery gauge may measure, for example, a remaining capacity of the battery 2096 or a voltage, a current, or a temperature during charging. The battery 2096 may include, for example, a rechargeable battery and/or a solar battery.

The indicator 2097 may display an indication of a certain state, e.g., a booting state, a message state, or a charging state, of the electronic apparatus 2000 or a portion thereof (e.g., the processor 2010). The motor 2098 may convert an electrical signal into mechanical vibrations and may generate a vibration or haptic effect or the like. Although not shown in FIG. 2B, the electronic apparatus 2000 may include a processing device (e.g., a GPU) for supporting a mobile TV. The processing device may process media data according to, for example, a digital multimedia broadcasting (DMB), digital video broadcasting (DVB), or mediaFlo™ standard.

Each of the components described in the present document may include one or more parts, and names of corresponding components may vary according to electronic apparatus types. According to one or more embodiments, the electronic apparatus 2000 may include at least one of the components described in the present document, and some of the components may be omitted, or other additional components may be further included. According to one or more embodiments, some of the components of the electronic apparatus 2000 may be integrated as one entity, and the entity may perform the same functions of the integrated components.

Hereinafter, an example in which the photographic apparatus 100 or 101 displays the thumbnail menu 400 when the live view image 300 is displayed is described in detail with reference to FIGS. 3A and 3B.

Figure 3A:
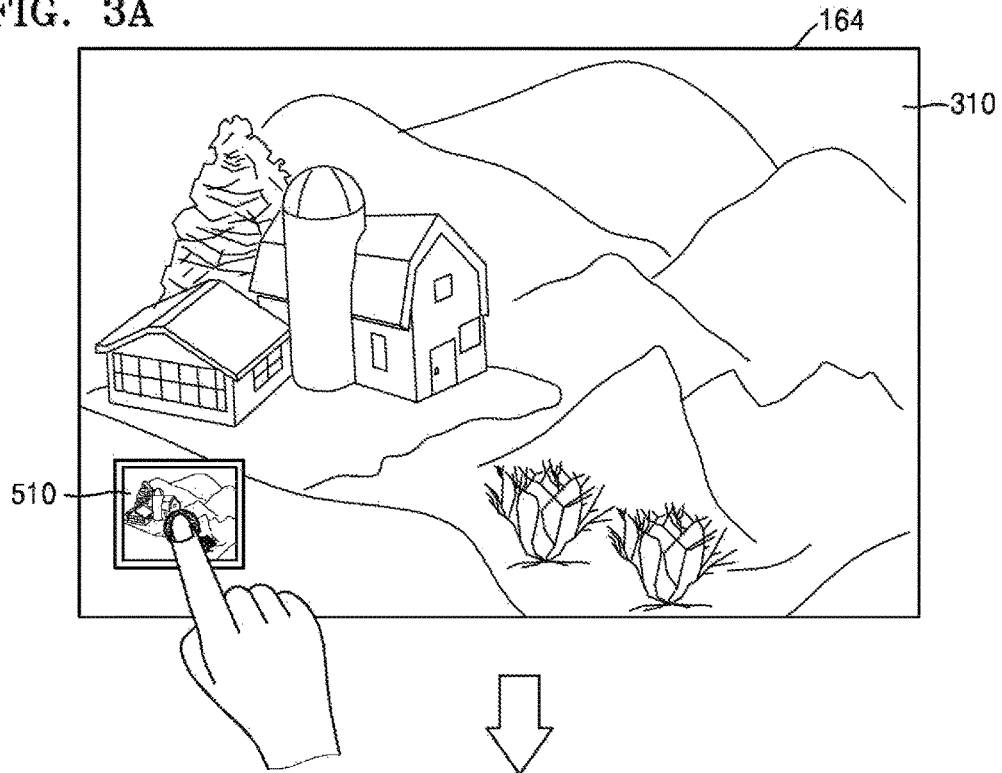
FIG. 3A is a diagram of an example of a user interface, according to an embodiment.
Figure 3B:
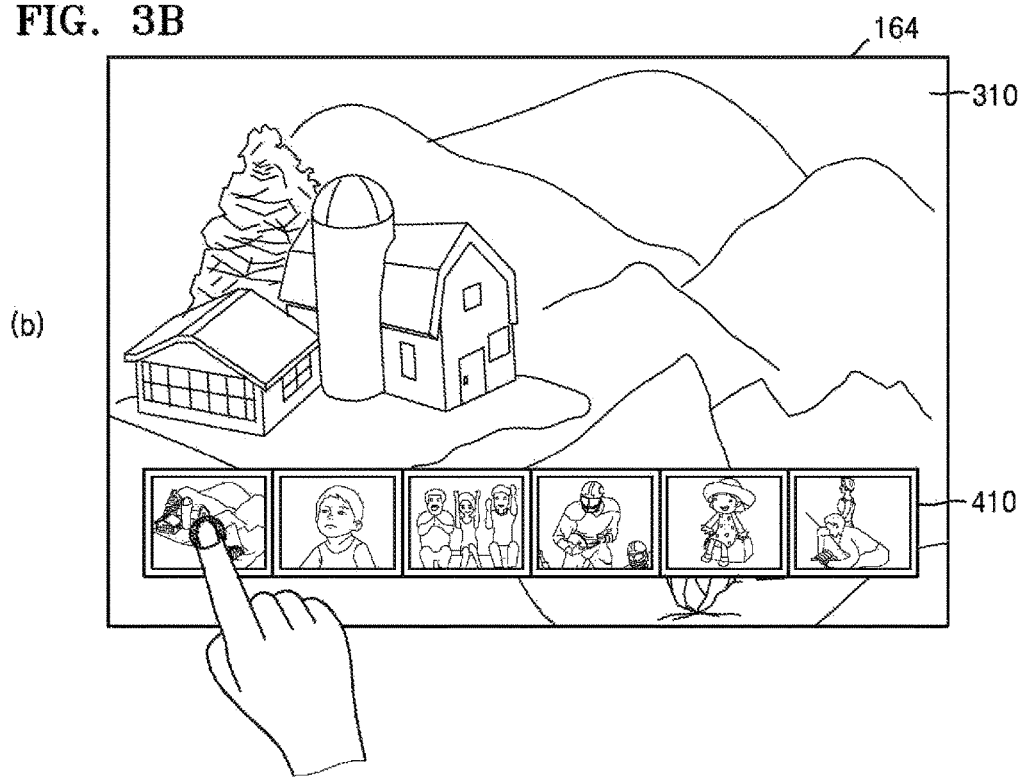
FIG. 3B is a diagram of an example of a user interface, according to an embodiment.

FIGS. 3A and 3B are diagrams of an example of a user interface. More particularly, FIGS. 3A and 3B show an example of the display 164 on which the live view image 310 is displayed. In other words, it is assumed that the photographic apparatus 100 or 101 is set to the photographic mode and the object to be photographed 200 is displayed on the display 164 in real-time.

Referring to FIG. 3A, the user performs a gesture on an icon 510 displayed in one region of the display 164, and the photographic apparatus 100 or 101 measures a duration of the gesture. For example, when the user touch and holds the icon 510, the photographic apparatus 100 or 101 measures a duration of the touch and hold.

Referring to FIG. 3B, when the touch and hold of the user lasts for a certain time or longer, the photographic apparatus 100 or 101 displays the thumbnail menu 410. In other words, the photographic apparatus 100 or 101 displays the thumbnail menu 410 together when the live view image 310 is displayed on the display 164. The certain time is preset to the photographic apparatus 100 or 101 and may be one second. However, the certain time is not limited thereto, and the time set when the photographic apparatus 100 or 101 was manufactured may be changed thereafter by the user. According to an embodiment, when the thumbnail menu 410 is displayed, the icon 510 may disappear from the display 164. According to another embodiment, the icon 510 may be continuously displayed together with the live view image 310 and the thumbnail menu 410.

According to the embodiment described above with reference to FIGS. 3A and 3B, an example in which the thumbnail menu 410 is displayed when the touch and hold is continuously maintained has been described. However, displaying the thumbnail menu 410 is not limited to the above-described example. In other words, even after the touch and hold ends, if a time for which the touch and hold is maintained is equal to the certain time or longer, the photographic apparatus 100 or 101 may display the thumbnail menu 410.

According to an embodiment, if the touch and hold of the user is continuously maintained, the photographic apparatus 100 or 101 measures a time for which the touch and hold of the user is maintained. According to another embodiment, if the touch and hold of the user ends (i.e., is released), the photographic apparatus 100 or 101 calculates a time from a start time point of the touch and hold to an end time point of the touch and hold immediately after the touch and hold ends. For example, if the user touched the icon 510 at 15:18:03 and ended the touch at 15:18:06, the photographic apparatus 100 or 101 calculates a touching time as three seconds. If it is assumed that the certain time is one second, the photographic apparatus 100 or 101 displays the thumbnail menu 410 on the live view image 310 immediately after the touch and hold ends.

The photographic apparatus 100 or 101 may perform various functions based on a gesture of the user, which is inputted after the thumbnail menu 410 is displayed. In other words, the photographic apparatus 100 or 101 receives a gesture inputted on a region on which the thumbnail menu 410 is displayed. Thereafter, the photographic apparatus 100 or 101 may perform a function corresponding to the received gesture.

For example, if an already captured image is plural in number, the thumbnail menu 410 initially displayed may not include all the already captured images. Therefore, the photographic apparatus 100 or 101 may change images included in the thumbnail menu 410 based on the user's gesture inputted after the initial thumbnail menu 410 was displayed.

As another example, the user may desire to share some of a plurality of imaged included in the thumbnail menu 410 with another person. The photographic apparatus 100 or 101 may transmit images included in the thumbnail menu 410 to another apparatus based on the user's gesture inputted after the thumbnail menu 410 was displayed.

As another example, the user may desire to delete some of a plurality of imaged included in the thumbnail menu 410. The photographic apparatus 100 or 101 may delete images included in the thumbnail menu 410 based on the user's gesture inputted after the thumbnail menu 410 was displayed.

Hereinafter, examples in which the photographic apparatus 100 or 101 performs various functions based on the user's gesture inputted after the thumbnail menu 410 was displayed are described in detail with reference to FIGS. 4A through 6B.

Figure 4A:
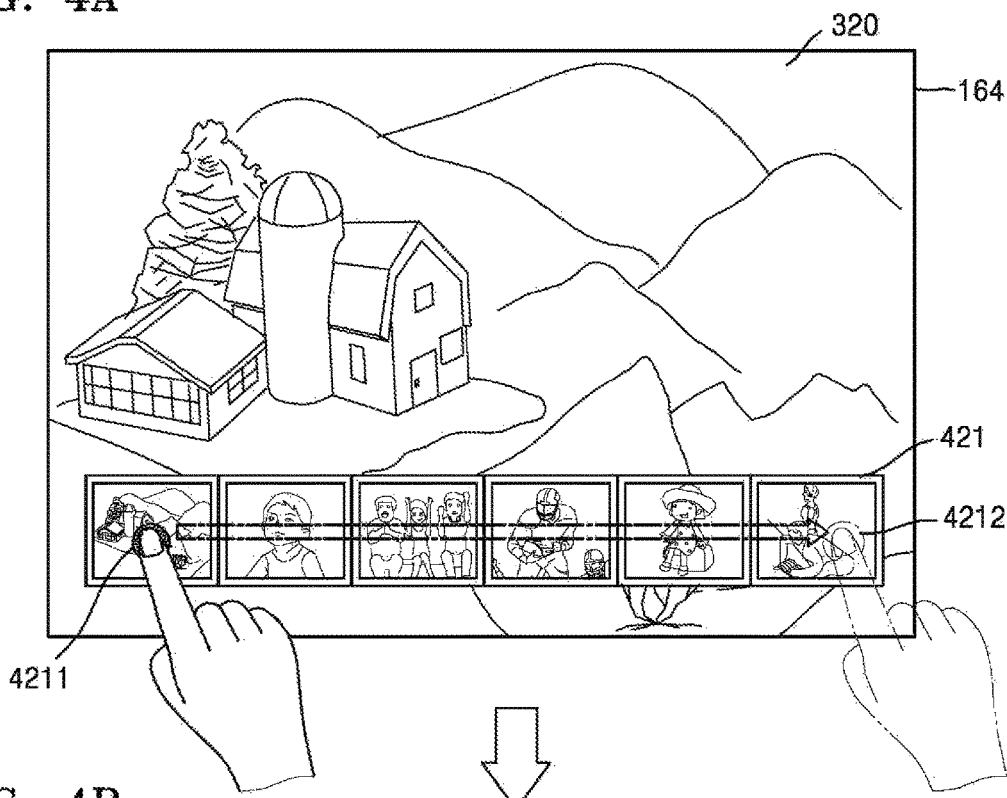
FIG. 4A is a diagram of an example of a user interface for changing images included in a thumbnail menu, according to an embodiment.
Figure 4B:
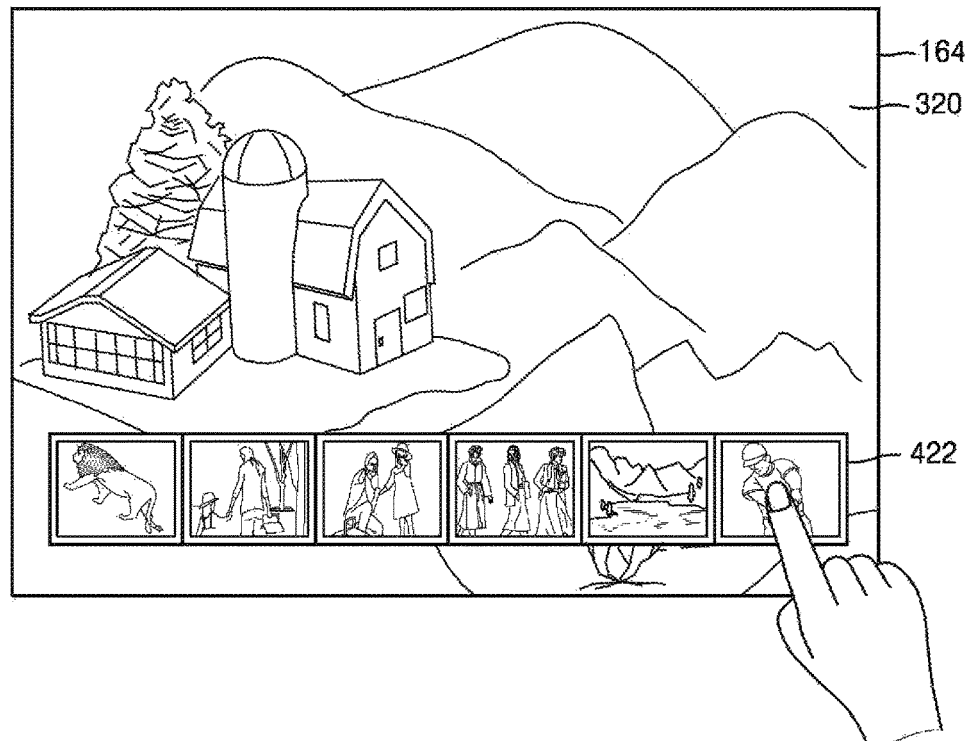
FIG. 4B is a diagram of an example of a user interface for changing images included in a thumbnail menu, according to an embodiment.

FIGS. 4A and 4B are diagrams of an example of a user interface for changing images included in a thumbnail menu 421, according to an embodiment. More particularly, FIGS. 4A and 4B show an example of the display 164 on which a live view image 320 is displayed. In other words, it is assumed that the photographic apparatus 100 or 101 is set to the photographic mode and the object to be photographed 200 is displayed on the display 164 in real-time.

Referring to FIG. 4A, the thumbnail menu 421 is displayed on the live view image 320. Although it is shown in FIG. 4A for a convenience of description that the thumbnail menu 421 includes a total of six already captured images, the number of images is not limited thereto.

The number of images already captured by the photographic apparatus 100 or 101 and stored in the memory 130 may be greater than the maximum number of images included in the thumbnail menu 421. For example, if it is assumed that a total of 200 images are stored in the memory 130, the thumbnail menu 421 cannot include 193 images. Therefore, the photographic apparatus 100 or 101 may change images included in the initially displayed thumbnail menu 421 to other images based on the user's gesture.

For example, the user may perform a drag on one point 4211 of the thumbnail menu 421 to another point 4212 while the thumbnail menu 421 is displayed. The photographic apparatus 100 or 101 may receive the user's drag and replace the images included in the thumbnail menu 421 by other images when a finger of the user arrives at the point 4212.

As another example, the user may perform a flick from the point 4211 to the point 4212. The photographic apparatus 100 or 101 may receive the user's flick and replace the images included in the thumbnail menu 421 by other images when the finger of the user arrives at the point 4212.

The number of images replaced by the photographic apparatus 100 or 101 when the user performs a drag may differ from the number of images replaced by the photographic apparatus 100 or 101 when the user performs a flick. For example, the photographic apparatus 100 or 101 may replace three images when the user performs a drag and replace six images when the user performs a flick. However, the number of replaced images is not limited the examples described above.

Referring to FIG. 4B, a thumbnail menu 422 including the replaced images is displayed. In other words, the images included in the thumbnail menu 421 of FIG. 4A differ from the images included in the thumbnail menu 422 of FIG. 4B. However, the number of images included in the thumbnail menu 421 of FIG. 4A is the same as the number of images included in the thumbnail menu 422 of FIG. 4B.

Figure 5A:
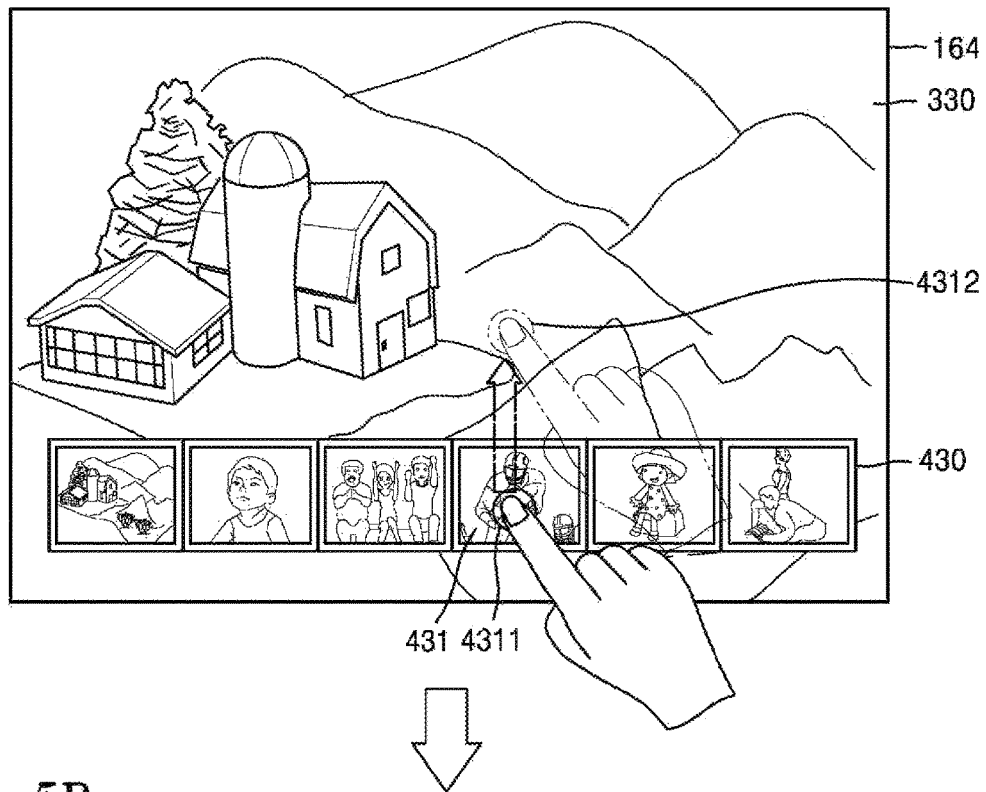
FIG. 5A is a diagram of an example of a user interface for sharing images included in a thumbnail menu with an external device, according to an embodiment.
Figure 5B:
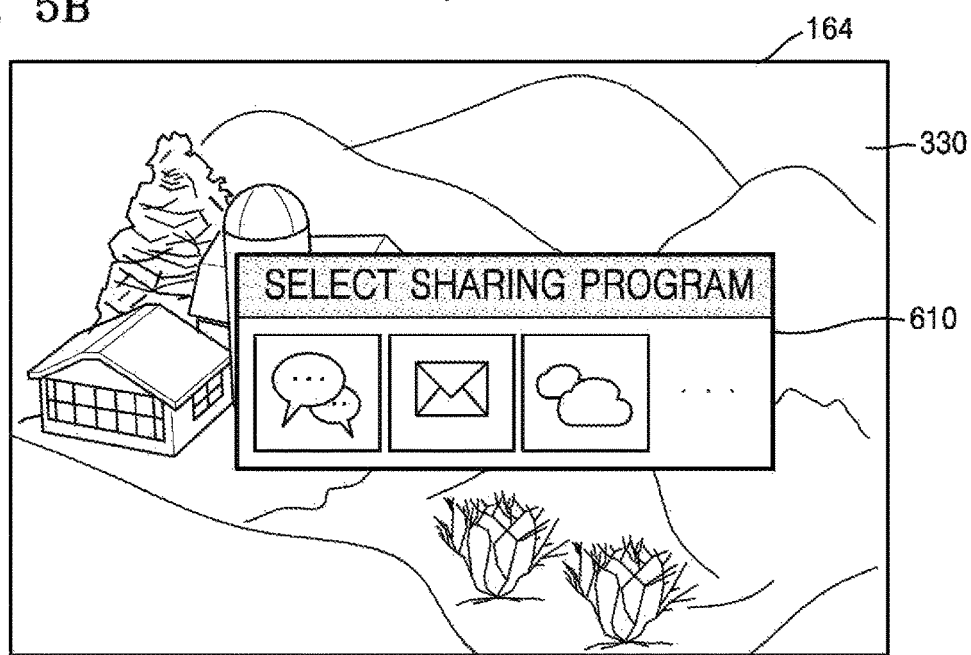
FIG. 5B is a diagram of an example of a user interface for sharing images included in a thumbnail menu with an external device, according to an embodiment

FIGS. 5A and 5B are diagrams of an example of a user interface for sharing images included in a thumbnail menu 430 with another apparatus, according to an embodiment. More particularly, FIGS. 5A and 5B show an example of the display 164 on which a live view image 330 is displayed. In other words, it is assumed that the photographic apparatus 100 or 101 is set to the photographic mode and the object to be photographed 200 is displayed on the display 164 in real-time.

Referring to FIG. 5A, the user may perform a drag on one point 4311 of a region on which the thumbnail menu 430 is displayed to another point 4312. A difference between the drag shown in FIG. 5A and the drag shown in FIG. 4A is that the end point 4312 of the drag shown in FIG. 5A is on a region outside the region on which the thumbnail menu 430 is displayed.

The photographic apparatus 100 or 101 may receive the user's drag and select an image 431 located at the drag start point 4311 from among images included in the thumbnail menu 430 as an image to be shared.

Referring to FIG. 5B, the photographic apparatus 100 or 101 may display a window 610 for requesting the user to select a sharing program on the display 164. The sharing program indicates a program to be used for the photographic apparatus 100 or 101 to transmit the selected image 431 to another apparatus.

When the user selects any one of programs displayed on the window 610, the photographic apparatus 100 or 101 may transmit the selected image 431 to another apparatus by using the selected program. Although not shown in FIGS. 5A and 5B, the photographic apparatus 100 or 101 may display a window (not shown) for requesting the user to select an apparatus to which the selected image 431 is to be transmitted and transmit the image 431 to the selected apparatus.

Figure 6A:
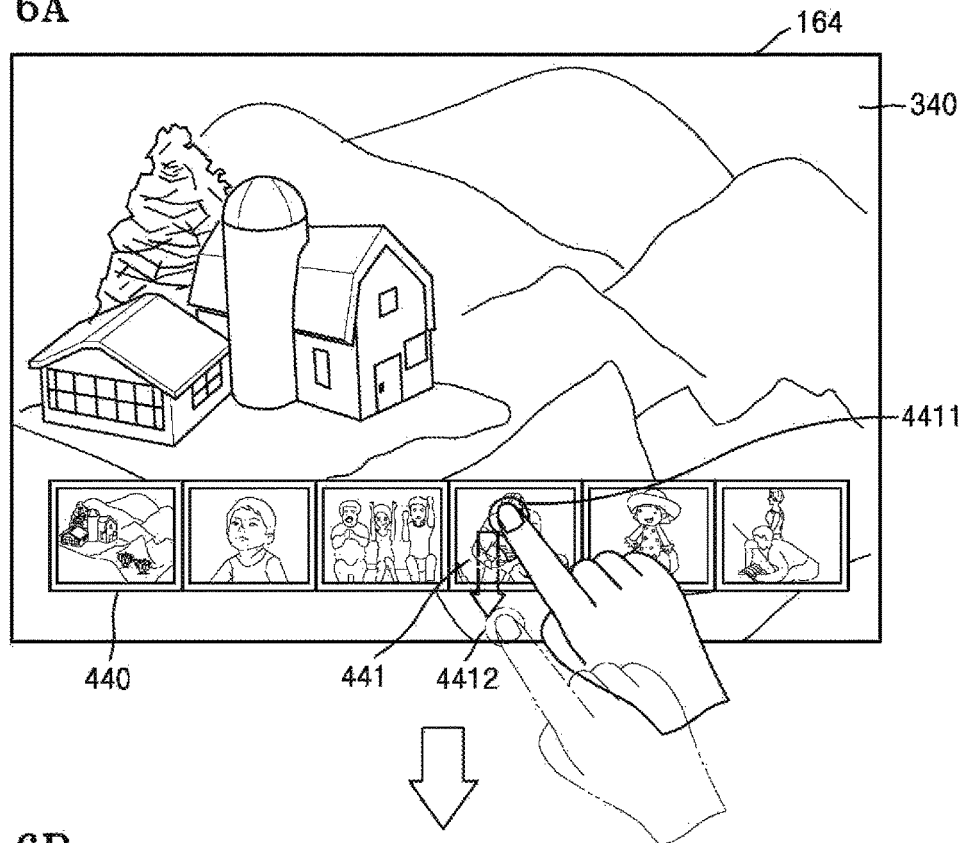
FIG. 6A is a diagram of an example of a user interface for deleting images included in a thumbnail menu, according to an embodiment.
Figure 6B:
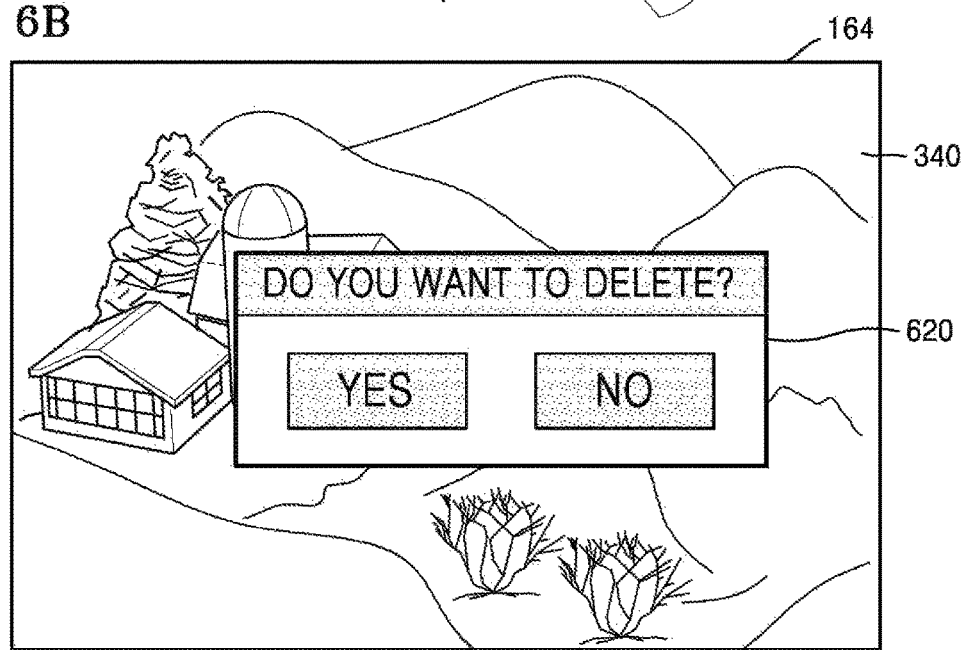
FIG. 6B is a diagram of an example of a user interface for deleting images included in a thumbnail menu, according to an embodiment.

FIGS. 6A and 6B are diagrams of an example of a user interface for deleting some of the images included in a thumbnail menu 440, according to an embodiment.

FIGS. 6A and 6B show an example of the display 164 on which a live view image 340 is displayed. In other words, it is assumed that the photographic apparatus 100 or 101 is set to the photographic mode and the object to be photographed 200 is displayed on the display 164 in real-time.

Referring to FIG. 6A, the user may perform a drag on one point 4411 of a region on which the thumbnail menu 440 is displayed to another point 4412. A difference between the drag shown in FIG. 5A and the drag shown in FIG. 6A is that the drag shown in FIG. 5A and the drag shown in FIG. 6A have different dragging directions.

The photographic apparatus 100 or 101 may receive the user's drag and select an image 441 located at the drag start point 4411 from among images included in the thumbnail menu 430 as an image to be deleted.

Referring to FIG. 6B, the photographic apparatus 100 or 101 may display a window 620 for asking the user whether to delete the image 441 on the display 164. In other words, the photographic apparatus 100 or 101 may delete the image 441 without asking the user whether to delete the image 441 or reconfirm the user about whether to delete the image 441 through the window 620.

According to the above description with reference to FIGS. 4A through 6B, the photographic apparatus 100 or 101 performs functions preset according to gestures acted by the user. For example, the functions corresponding to the gestures may be specified when the photographic apparatus 100 or 101 was manufactured or arbitrarily set by the user afterwards.

Hereinafter, an example in which the user sets a function corresponding to a gesture is described with reference to FIGS. 7A and 7B.

FIGS. 7A and 7B are diagrams of an example of user interface for associating a function with a particular gesture, according to an embodiment. More particularly, FIGS. 7A and 7B show an example of the display 164 on which a live view image 350 is displayed. In other words, it is assumed that the photographic apparatus 100 or 101 is set to the photographic mode and the object to be photographed 200 is displayed on the display 164 in real-time.

Referring to FIG. 7A, a window 630 through which the user may set a function for each of gestures may be displayed on the display 164. In other words, gestures which may be acted by the user are listed in the window 630, and a function set by the user for each of the gestures may be displayed. In this case, the function indicates a function which is executable by the photographic apparatus 100 or 101. For example, the function may correspond to sharing an image, deleting an image, filtering on an image, a mode change, capturing an image, setting a timer, zoom in/out, activating a flash, power on/off of the photographic apparatus 100 or 101, or the like.

Referring to FIG. 7B, if the user selects any one 631 of the gestures displayed on the window 630, the photographic apparatus 100 or 101 may display a window 640 through which the user may set a function on the display 164. In this case, various functions which are executable by the photographic apparatus 100 or 101 are listed in the window 640. When the user selects any one 641 of the listed functions, the selected function 641 may be mapped to the selected gesture 631.

Hereinafter, an example of entering the gallery mode based on an image selected from a thumbnail menu is described with reference to FIGS. 8A and 8B.

Figure 8A:
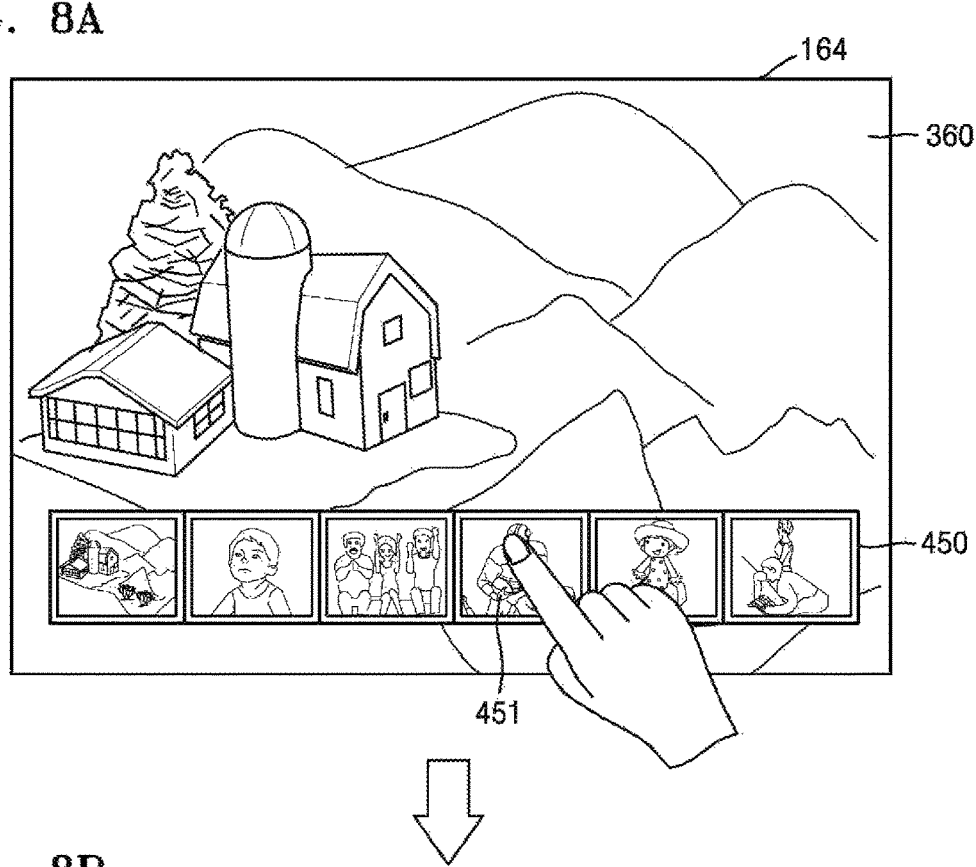
FIG. 8A is a diagram of an example of a user interface for transitioning from a photographic mode to a gallery mode, according to an embodiment.
Figure 8B:
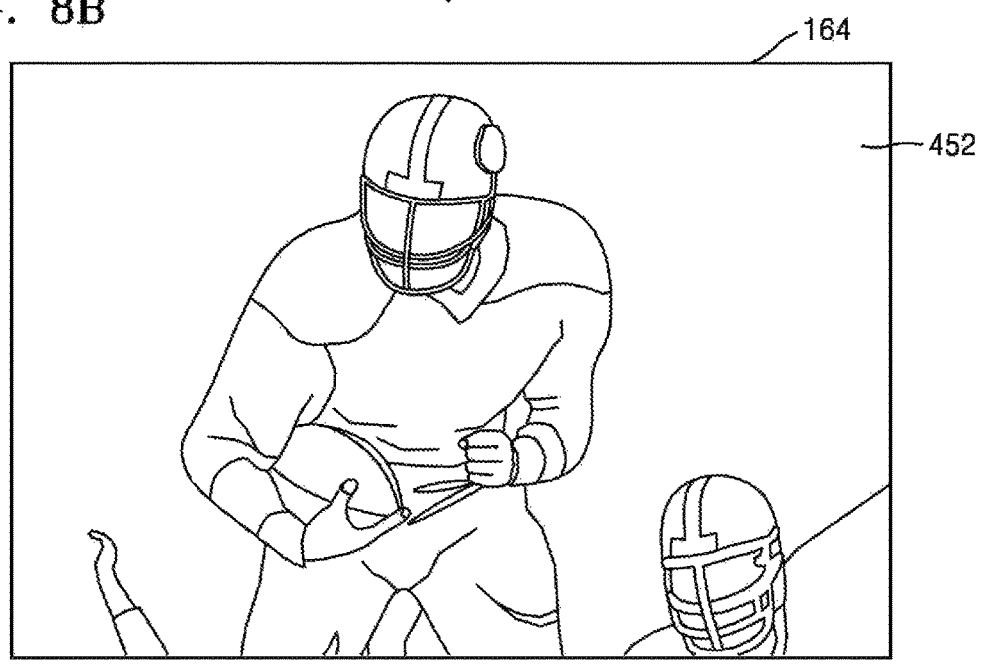
FIG. 8B is a diagram of an example of a user interface for transitioning from a photographic mode to a gallery mode, according to an embodiment.

FIGS. 8A and 8B are diagrams of an example of a user interface for transitioning from a photographic mode to a gallery mode, according to an embodiment. More particularly, FIG. 8A shows an example of the display 164 on which a live view image 360 is displayed. In other words, it is assumed that the photographic apparatus 100 or 101 is set to the photographic mode and the object to be photographed 200 is displayed on the display 164 in real-time.

In general, in order to change a camera from the photographic mode to the gallery mode, it is recommended that the user selects the gallery mode from a menu of the camera. According to an embodiment, the photographic apparatus 100 or 101 may automatically enter the gallery mode when the user selects one image 451 included in a thumbnail menu 450 in the photographic mode (i.e., while the live view image 360 is displayed).

Referring to FIG. 8A, both the live view image 360 and the thumbnail menu 450 are displayed on the display 164. A detailed operation by which the photographic apparatus 100 or 101 displays both the live view image 360 and the thumbnail menu 450 is the same as described in detail with reference to FIGS. 3A and 3B. Therefore, a detailed description thereof is omitted hereinafter.

The photographic apparatus 100 or 101 receives a gesture inputted on a region on which the thumbnail menu 450 is displayed. In other words, the user may perform a gesture on the region on which the thumbnail menu 450 is displayed, and the photographic apparatus 100 or 101 may recognize the gesture acted by the user.

For example, the user may touch any one 451 of a plurality of images included in the thumbnail menu 450. In detail, the user may touch one point of the region on which the thumbnail menu 450 is displayed, and the photographic apparatus 100 or 101 may select the image 451 included in the thumbnail menu 450 based on location information of the touched point.

Referring to FIG. 8B, the photographic apparatus 100 or 101 enters the gallery mode. In other words, the photographic apparatus 100 or 101 changes the photographic mode to the gallery mode. The gallery mode indicates a mode in which the user may view or manage (e.g., transmit or delete) an already captured image or add an effect to the already captured image.

For example, the photographic apparatus 100 or 101 may display an image 452 selected by the user on the display 164 as soon as entering the gallery mode. In other words, the photographic apparatus 100 or 101 may stop displaying both the live view image 360 and the thumbnail menu 450 and display only the image 452 selected by the user. Therefore, the user may particularly observe the image 452 and may add various effects to the image 452, delete the image 452, or transmit the image 452 to another apparatus.

According to the above description with reference to FIGS. 3A through 8B, the number of images included in a thumbnail menu is constant. In other words, the photographic apparatus 100 or 101 may display a thumbnail menu including a constant number of images on the display 164.

The photographic apparatus 100 or 101 may change the number of images included in a thumbnail menu based on a gesture inputted by the user. For example, the photographic apparatus 100 or 101 may increase the number of images included in a thumbnail menu in proportion to a duration of a gesture.

Hereinafter, examples in which the photographic apparatus 100 or 101 changes the number of images included in a thumbnail menu are described with reference to FIGS. 9A through 10C.

Figure 9A:
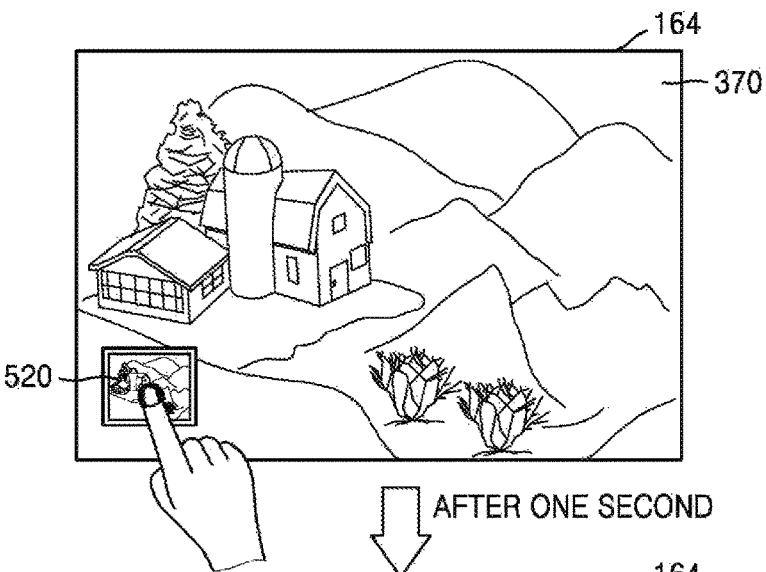
FIG. 9A is a diagram of an example of a user interface for changing the number of images included in a thumbnail menu, according to an embodiment.
Figure 9B:
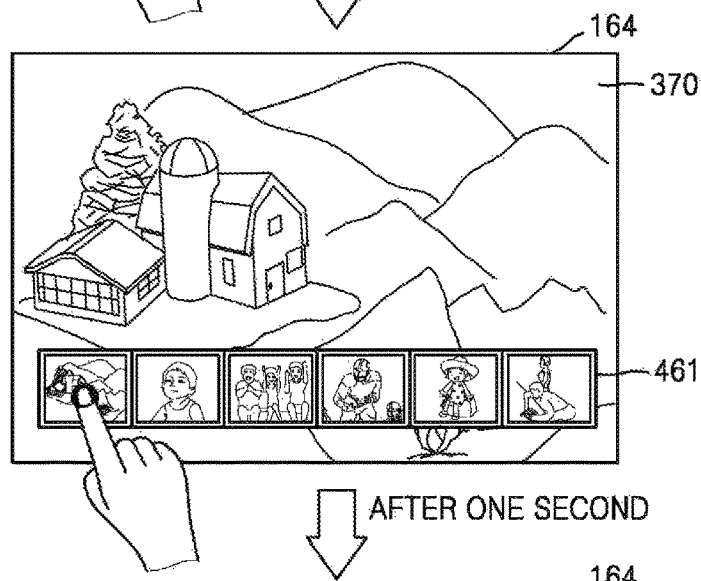
FIG. 9B is a diagram of an example of a user interface for changing the number of images included in a thumbnail menu, according to an embodiment.
Figure 9C:
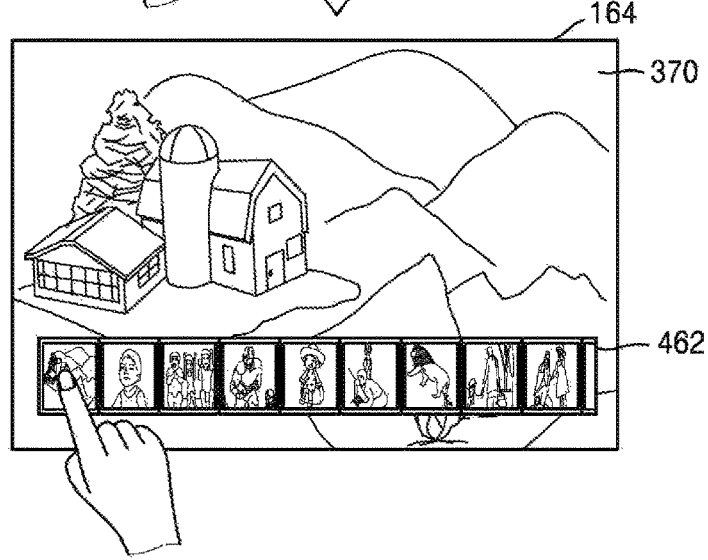
FIG. 9C is a diagram of an example of a user interface for changing the number of images included in a thumbnail menu, according to an embodiment.

FIGS. 9A-C are diagrams of an example of a user interface for changing the number of images included in a thumbnail menu, according to an embodiment. More particularly, FIGS. 9A-C show an example of the display 164 on which a live view image 370 is displayed. In other words, it is assumed that the photographic apparatus 100 or 101 is set to the photographic mode and the object to be photographed 200 is displayed on the display 164 in real-time.

When the user performs a gesture on an icon 520 while the live view image 370 is displayed, the photographic apparatus 100 or 101 may display a thumbnail menu. When the gesture of the user is a touch and hold, the photographic apparatus 100 or 101 displays a thumbnail menu on the display 164 if the duration of the touch and hold meets a threshold.

For example, if the touch and hold of the user is continuously maintained, the photographic apparatus 100 or 101 may measure a time for which the touch and hold is continuously maintained and determine whether the measured time is equal to a first certain time or longer. In this case, if the touch time of the user exceeds the first certain time (e.g., one second) and is a second certain time (e.g., two seconds) or more, the photographic apparatus 100 or 101 may increase the number of images included in a thumbnail menu.

Referring to FIG. 9A, the user may touch the icon 520 displayed in one region of the display 164 and maintain the touched state (i.e., a touch and hold). The photographic apparatus 100 or 101 measures a time for which the touch of the user is maintained.

Referring to FIG. 9B, the photographic apparatus 100 or 101 displays a first thumbnail menu 461 on the live view image 370 if the measured time exceeds the first certain time. In other words, the photographic apparatus 100 or 101 displays the live view image 370 on the display 164 before the touch of the user is inputted, and further displays the first thumbnail menu 461 on the display 164 if a time for which the touch is maintained exceeds the first certain time. The first certain time may be preset when the photographic apparatus 100 or 101 was manufactured and thereafter changed to an arbitrary time by the user.

The user may continuously maintain the touch while the first thumbnail menu 461 is displayed. In other words, the user may continuously maintain the touch even after the first thumbnail menu 461 is displayed, by means of a touch and hold. In this case, the photographic apparatus 100 or 101 continuously measures a time for which the touch is maintained.

Referring to FIG. 9C, the photographic apparatus 100 or 101 displays a second thumbnail menu 462 on the live view image 370 if the measured time exceeds the second certain time. In other words, the photographic apparatus 100 or 101 displays the second thumbnail menu 462 instead of the first thumbnail menu 461.

The second certain time indicates a longer time than the first certain time. For example, if it is assumed that the first certain time is one second, the second certain time indicates a longer time than one second.

Also, the second thumbnail menu 462 includes a larger number of images than that included in the first thumbnail menu 461. For example, if it is assumed that the first thumbnail menu 461 includes a total of six different images, the second thumbnail menu 462 includes at least seven different images.

The user may end a touch after touching the icon 520. In this case, the photographic apparatus 100 or 101 calculates a time from a touch and hold start time point to a touch and hold end time point immediately after the touch and hold ends. Thereafter, the photographic apparatus 100 or 101 may determine whether the calculated time is equal to the first certain time or longer. If the calculated time exceeds the first certain time (e.g., one second) and is the second certain time (e.g., two seconds) or more, the photographic apparatus 100 or 101 may increase the number of images included in a thumbnail menu.

Hereinafter, examples in which the photographic apparatus 100 or 101 changes the number of images included in a thumbnail menu after a touch of the user ends are described with reference to FIGS. 10A through 10C.

FIGS. 10A-C are diagrams of an example of a user interface for changing the number of images included in a thumbnail menu, according to an embodiment. More particularly, FIGS. 10A-C show an example of the display 164 on which a live view image 380 is displayed. In other words, it is assumed that the photographic apparatus 100 or 101 is set to the photographic mode and the object to be photographed 200 is displayed on the display 164 in real-time.

Referring to FIG. 10A, the user may touch an icon 530 displayed in one region of the display 164 and maintain the touched state (i.e., a touch and hold). Thereafter, the user may end the touch after a certain time elapses. Immediately after the touch of the user ends, the photographic apparatus 100 or 101 measures a time for which the touch of the user is maintained.

Referring to FIG. 10B, the photographic apparatus 100 or 101 displays a first thumbnail menu 471 on a live view image 380 if the measured time exceeds the first certain time. In other words, the photographic apparatus 100 or 101 displays the live view image 380 on the display 164 before the touch of the user is inputted, and further displays the first thumbnail menu 471 on the display 164 if a time for which the touch is maintained exceeds the first certain time. The first certain time may be preset when the photographic apparatus 100 or 101 was manufactured and thereafter changed to an arbitrary time by the user.

Referring to FIG. 10C, the photographic apparatus 100 or 101 displays a second thumbnail menu 472 on the live view image 370 if the measured time exceeds the second certain time. The second certain time indicates a longer time than the first certain time. For example, if it is assumed that the first certain time is one second, the second certain time indicates a longer time than one second. Also, the second thumbnail menu 472 includes a larger number of images than that included in the first thumbnail menu 471. For example, if it is assumed that the first thumbnail menu 471 includes a total of six different images, the second thumbnail menu 472 includes at least seven different images.

The photographic apparatus 100 or 101 may magnify and display any one of images included in the first or second thumbnail menu 471 or 472 based on a gesture inputted while the first or second thumbnail menu 471 or 472 is displayed.

Figure 11A:
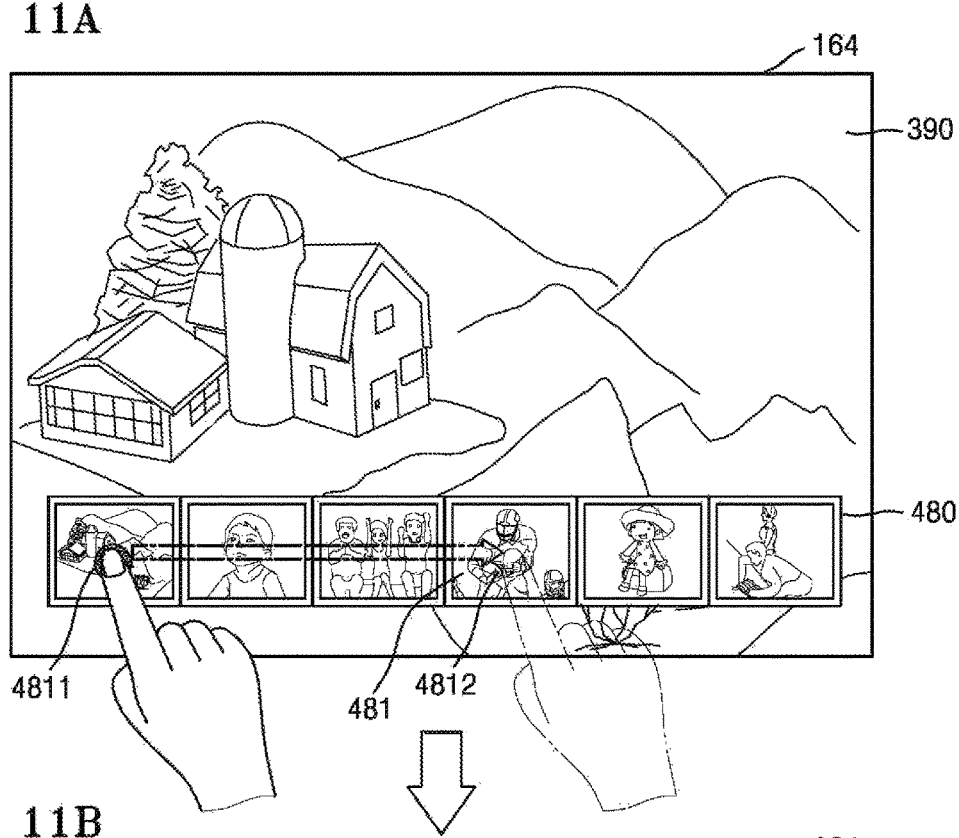
FIG. 11A is a diagram of an example of a user interface for displaying any of the images included in a thumbnail menu, according to an embodiment.
Figure 11B:
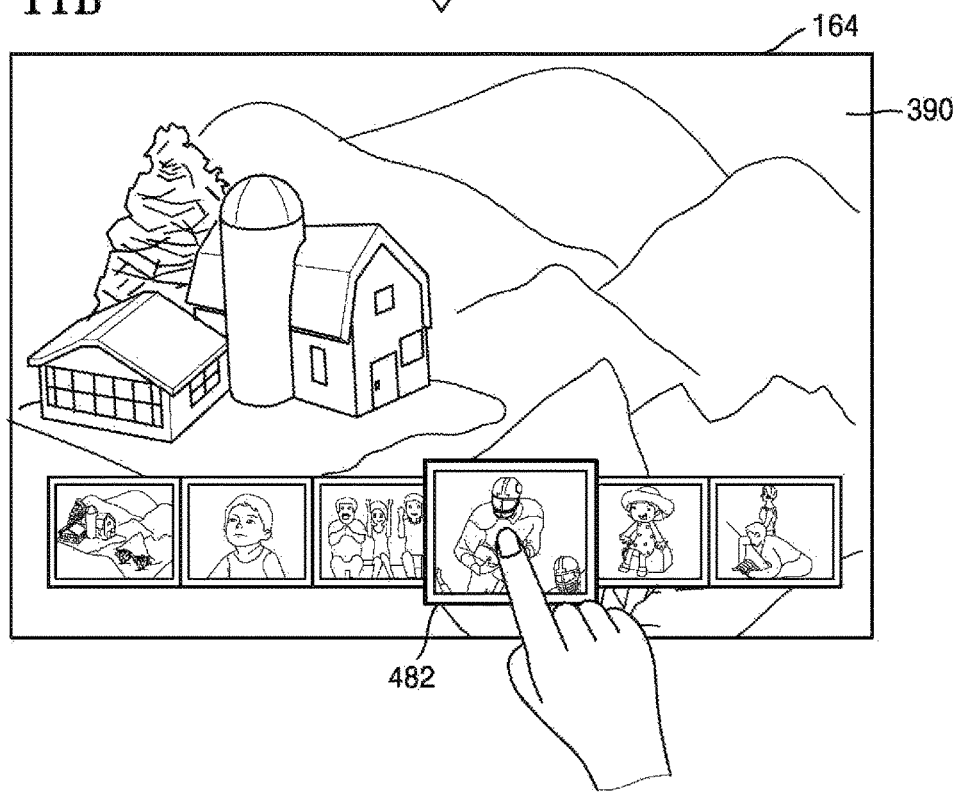
FIG. 11B is a diagram of an example of a user interface for displaying any of the images identified in a thumbnail menu, according to an embodiment.

FIGS. 11A and 11B are diagrams of an example of user interface for displaying any of the images included in a thumbnail menu 480, according to an embodiment.

FIGS. 11A and 11B show an example of the display 164 on which a live view image 380 is displayed. In other words, it is assumed that the photographic apparatus 100 or 101 is set to the photographic mode and the object to be photographed 200 is displayed on the display 164 in real-time.

Referring to FIG. 11A, the user may drag from on point 4811 of a region on which the thumbnail menu 480 is displayed to other point 4812. A difference between the drag shown in FIG. 11A and the drag shown in FIG. 4A is that the drag shown in FIG. 11A does not arrive at the other side of the region on which the thumbnail menu 480. In other words, the drag shown in FIG. 11A stops at a point where any one of a plurality of images included in the thumbnail menu 480 is displayed.

The photographic apparatus 100 or 101 recognizes the user's drag start point 4811 and drag end point 4812 and magnifies a size of the image 481 displayed at the drag end point 4812.

Referring to FIG. 11B, a magnified image 482 of the image 481 displayed at the drag end point 4812 is displayed on the thumbnail menu 480. Although FIG. 11B shows that only the image 481 displayed at the drag end point 4812 is magnified, the present embodiment is not limited thereto. In other words, photographic apparatus 100 or 101 may sequentially magnify and display images located on a path of a drag.

Although not shown in FIGS. 3A through 11B, the photographic apparatus 100 or 101 may stop displaying a thumbnail menu based on a gesture received from the user. In other words, when the user inputs a gesture (e.g., a touch), the photographic apparatus 100 or 101 recognizes that the user's gesture is inputted on a region remaining by excluding a region on which the thumbnail menu is displayed on the display 164. Thereafter, the photographic apparatus 100 or 101 stops displaying the thumbnail menu. That is, the photographic apparatus 100 or 101 deletes only the thumbnail menu among a live view image and the thumbnail menu displayed on the display 164. Therefore, the user may perform photographic by referring to the live view image displayed on the entire display 164.

Figure 12:
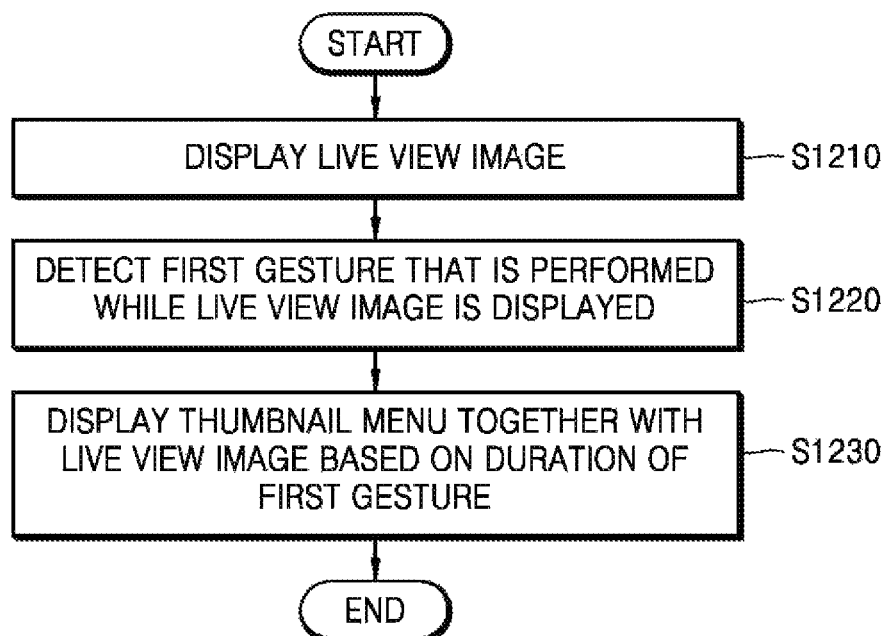
FIG. 12 is a flowchart of an example of a process, according to an embodiment.

FIG. 12 is a flowchart of an example of a process, according to an embodiment.

Referring to FIG. 12, the method of controlling the photographic apparatus 100 or 100a includes operations sequentially processed by the photographic apparatus 100 or 100a shown in FIG. 1A or 2A. Therefore, even though omitted hereinafter, the above description related to the photographic apparatus 100 or 100a shown in FIG. 1A or 2A may be applied to the method of FIG. 12.

In operation S1210, the photographic apparatus 100 or 100a displays a live view image on the screen. In other words, the photographic apparatus 100 or 100a displays the live view image on the display 164. The live view image indicates an image in which the object to be photographed 200 in sight of the photographic apparatus 100 or 100a (i.e., sight of a lens included in the photographic apparatus 100 or 100a) is shown.

In operation S1220, the photographic apparatus 100 or 100a detects a first gesture inputted in one region of the screen while the live view image is displayed. In other words, the photographic apparatus 100 or 100a detects the first gesture inputted on the display 164. The first gesture may indicate a touch and hold but is not limited thereto.

In operation S1230, the photographic apparatus 100 or 100a displays both a thumbnail menu and the live view image on the screen. In other words, the photographic apparatus 100 or 100a further displays the thumbnail menu on the display 164 on which the live view image is displayed.

For example, if the touch and hold of the user is continuously maintained, the photographic apparatus 100 or 100a measures a time for which the touch and hold continues. As another example, if the touch and hold of the user ends, the photographic apparatus 100 or 100a calculates a time from a touch and hold start time point to a touch and hold end time point immediately after the touch and hold ends.

FIG. 13 is a flowchart of an example of a process, according to another embodiment.

Referring to FIG. 13, the method of controlling the photographic apparatus 100 or 100a includes operations sequentially processed by the photographic apparatus 100 or 100a shown in FIG. 1A or 2A. Therefore, even though omitted hereinafter, the above description related to the photographic apparatus 100 or 100a shown in FIG. 1A or 2A may be applied to the method of FIG. 13.

In operation S1310, the photographic apparatus 100 or 100a displays a live view image. That is, this indicates that the photographic apparatus 100 or 100a is set to the photographic mode and the object to be photographed 200 is displayed on the display 164 in real-time.

In operation S1320, the photographic apparatus 100 or 100a detects a touch input of the user. The touch input of the user may indicate a touch and hold on an icon displayed on the display 164 but is not limited thereto.

In operation S1330, the photographic apparatus 100 or 100a determines whether the duration of the touch meets a threshold. For example, the photographic apparatus 100 or 100a may determine whether the touch of the user has lasted for a certain time or longer. The certain time may be set when the photographic apparatus 100 or 100a was manufactured or arbitrarily set by the user.

If the touch of the user has lasted for the certain time or longer, the method proceeds to operation S1340, otherwise, the method proceeds to operation S1370.

In operation S1340, the photographic apparatus 100 or 100a displays a thumbnail menu on the display 164. In other words, the photographic apparatus 100 or 100a displays both the live view image and the thumbnail menu on the display 164.

In operation S1350, the photographic apparatus 100 or 100a detects a gesture of the user. In other words, the user inputs the gesture while both the live view image and the thumbnail menu are displayed. In this case, the gesture may be inputted on a region on which the thumbnail menu is displayed or on a region on which the thumbnail menu is not displayed, on the display 164.

In operation S1360, the photographic apparatus 100 or 100a performs a function corresponding to the received gesture. For example, the photographic apparatus 100 or 100a may perform a function of transmitting at least one of a plurality of images included in the thumbnail menu to another apparatus, a function of deleting the at least one image, a function of magnifying and displaying any one of the plurality of images included in the thumbnail menu, a function of entering the gallery mode, or a function of stopping displaying the thumbnail menu.

In operation S1370, the photographic apparatus 100 or 100a transitions into the gallery mode. For example, if the duration of the user's touch fails to meet the threshold, the photographic apparatus 100 or 100a changes the photographic mode to the gallery mode.

According to the above description, a photographic apparatus may display already captured images on a screen as a thumbnail menu without separately entering the gallery mode. Therefore, a user may easily view the already-captured images even while a live view image is displayed on the screen and reduce a time taken for a mode change (i.e., a change between the photographic mode and the gallery mode).

In addition, the photographic apparatus may perform various functions based on a gesture inputted by the user, and thus, the user may intuitively and easily the photographic apparatus.

FIGS. 1-13 are provided as an example only. At least some of the operations discussed with respect to these figures can be performed concurrently, performed in different order, and/or altogether omitted. It will be understood that the provision of the examples described herein, as well as clauses phrased as "such as," "e.g.", "including", "in some aspects," "in some implementations," and the like should not be interpreted as limiting the claimed subject matter to the specific examples.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for".

Moreover, the embodiments disclosed in this specification are suggested for the description and understanding of technical content but do not limit the range of the present disclosure. Accordingly, the range of the present disclosure should be interpreted as including all modifications or various other embodiments based on the technical idea of the present disclosure.

What is claimed is:

1. A method comprising:
    displaying a live view image on a touchscreen of an apparatus;
    receiving user input to configure one or more of a plurality of available gestures via a setting window superimposed over the live view image, the user input associating each of the one or more of the plurality of available gestures with a function selected from a plurality of available functions;
    detecting a first gesture that is performed on the touchscreen when the live view image is displayed;
    displaying a thumbnail menu on the touchscreen together with the live view image based on a duration of the first gesture, the thumbnail menu including a plurality of thumbnails each corresponding to a pre-captured image;
    detecting a second gesture that is performed on the touchscreen selecting one of the plurality of thumbnails;
    determining an operation to be performed corresponding to the second gesture,
    wherein the operation to be performed is the function associated with the second gesture that was configured by the user input; and
    performing the determined operation.

2. The method of claim 1, wherein:
    the thumbnail menu is displayed in response to the duration of the first gesture meeting a threshold.

3. The method of claim 1, wherein the duration of the first gesture includes a period starting at a start time of the first gesture and ending at an end time of the first gesture.

4. The method of claim 1, wherein displaying the thumbnail menu comprises increasing a count of pre-captured images included in the thumbnail menu in proportion to the duration of the first gesture.

5. The method of claim 1, wherein the operation to be performed includes at least one of:

transmitting the pre-captured image corresponding to the selected thumbnail to an external device or deleting the pre-captured image corresponding to the selected thumbnail.

6. The method of claim 1, wherein the operation to be performed includes at least one of magnifying the selected thumbnail and entering a gallery mode.

7. The method of claim 1, wherein the operation to be performed includes at least one of filtering on the pre-captured image corresponding to the selected thumbnail, setting a timer of the apparatus, activating a flash of the apparatus, or powering off the apparatus.

8. The method of claim 1, further comprising:
detecting a third gesture that is performed outside of the thumbnail menu; and
hiding the thumbnail menu in response to the third gesture.

9. A non-transitory computer-readable recording medium having recorded thereon a computer-readable program for performing the method of claim 1.

10. An apparatus comprising:
a touchscreen display;
a memory; and
at least one processor operatively coupled to the memory, the at least one processor configured to:
display a live view image on the touchscreen display;
receive user input to configure one or more of a plurality of available gestures via a setting window superimposed over the live view image, the user input associating each of the one or more of the plurality of available gestures with a function selected from a plurality of available functions;
detect a first gesture that is performed on the touchscreen display when the live view image is displayed;
display a thumbnail menu on the touchscreen display together with the live view image based on a duration of the first gesture, the thumbnail menu including a plurality of thumbnails each corresponding to a pre-captured image;
detect a second gesture that is performed on the touchscreen display selecting one of the plurality of thumbnails;
determine an operation to be performed corresponding to the second gesture, wherein the operation to be performed is the function associated with the second gesture that was configured by the user input and perform the determined operation.

11. The apparatus of claim 10, wherein:
the thumbnail menu is displayed in response to the duration of the first gesture meeting a threshold.

12. The apparatus of claim 10, wherein the duration of the first gesture includes a period starting at a start time of the first gesture and ending at an end time of the first gesture.

13. The apparatus of claim 10, wherein the at least one processor is further configured to increase a count of images included in the thumbnail menu in proportion to the duration of the first gesture.

14. The apparatus of claim 10, wherein the operation to be performed includes at least one of
transmitting the pre-captured image corresponding to the selected thumbnail to an external device or deleting the pre-captured image corresponding to the selected thumbnail.

15. The apparatus of claim 10, wherein the operation to be performed includes at least one of magnifying the selected thumbnail and entering a gallery mode.

16. The apparatus of claim 10, wherein the operation to be performed includes at least one of filtering on the pre-captured image corresponding to the selected thumbnail, setting a timer of the apparatus, activating a flash of the apparatus, or powering off the apparatus.

17. The apparatus of claim 10, wherein the at least one processor is further configured to:
detect a third gesture that is performed outside of the thumbnail menu; and
hide the thumbnail menu in response to the third gesture.

\* \* \* \* \*